(12) United States Patent
Friedrich et al.

(10) Patent No.: US 7,797,928 B2
(45) Date of Patent: Sep. 21, 2010

(54) METHOD AND APPARATUS FOR PURIFYING EXHAUST GASES

(75) Inventors: Gerhard Friedrich, Illingen (DE); Grigorios Kolios, Lörrach (DE); Volker Schmeisser, Stuttgart (DE); Ute Tuttlies, Ostfildern (DE); Frank Opferkuch, Unterensingen (DE); Gerhart Eigenberger, Neustadt (DE)

(73) Assignee: Univeritaet Stuttgart, Stuttgart (DE)

( * ) Notice: Subject to any disclaimer, the term of this patent is extended or adjusted under 35 U.S.C. 154(b) by 1203 days.

(21) Appl. No.: 10/556,336

(22) PCT Filed: May 6, 2004

(86) PCT No.: PCT/EP2004/004793

§ 371 (c)(1),
(2), (4) Date: Dec. 1, 2005

(87) PCT Pub. No.: WO2004/099577

PCT Pub. Date: Nov. 18, 2004

(65) Prior Publication Data

US 2006/0096282 A1    May 11, 2006

(30) Foreign Application Priority Data

May 10, 2003   (EP)   .................... 03010528

(51) Int. Cl.
*F01N 3/00*    (2006.01)
(52) U.S. Cl. .............. 60/284; 60/274; 60/286; 60/295; 60/296; 60/303; 60/298
(58) Field of Classification Search ........... 60/274, 60/284, 286, 295, 296, 297, 298, 303
See application file for complete search history.

(56) References Cited

U.S. PATENT DOCUMENTS 1,927,286 A * 9/1933 Jaeger et al. .......... 422/208

(Continued)

FOREIGN PATENT DOCUMENTS

DE   199 26 150   12/2000

(Continued)

OTHER PUBLICATIONS

Opferkuch, Gaiser, Eigenberger: "Entfernung oxidierbarer Aerosole aus Abluftstromen" [Removal of oxidizable aerosols from waste air streams], FZKA-BWPLUS 8 (1998), http://www.bwplus.fzk.de (to Follow).

(Continued)

*Primary Examiner*—Tu M Nguyen
(74) *Attorney, Agent, or Firm*—Davis & Bujold, P.L.L.C.

(57) ABSTRACT

In a method for purifying exhaust gases in particular from lean-burn internal combustion engines having an exhaust-gas converter with a heat exchanger and catalysts arranged in inflow and/or outflow passages, the heat exchanger exhaust gas which flows in is heated by heat exchange with exhaust gas which flows. The incoming exhaust gas enters the inflow passages without encountering any obstacle susceptible to blockages, and flows through the inflow passages to a diversion region. Heat is fed to the exhaust gas by means of a burner. The burner is operated with fuel, air and engine exhaust gas in such a way that it supplies either an oxidizing or a reducing exhaust gas. Burner exhaust gas is admixed to the gas which emerges from the inflow passages and, together with this gas, enters the outflow passages, where nitrogen oxides are removed from it by a deNOxing catalyst present in the outflow passages.

16 Claims, 10 Drawing Sheets

U.S. PATENT DOCUMENTS

| | | | |
|---|---|---|---|
| 2,898,202 A * | 8/1959 | Eriksson et al. | 422/115 |
| 4,271,110 A | 6/1981 | Minjolle | |
| 4,535,588 A * | 8/1985 | Sato et al. | 60/286 |
| 5,303,547 A | 4/1994 | Mieville et al. | |
| 5,653,105 A * | 8/1997 | Noirot et al. | 60/297 |
| 5,829,248 A * | 11/1998 | Clifton | 60/286 |
| 6,207,116 B1 | 3/2001 | Heed | |
| 6,742,328 B2 * | 6/2004 | Webb et al. | 60/285 |
| 6,824,743 B1 * | 11/2004 | Pawson et al. | 422/171 |
| 6,935,105 B1 * | 8/2005 | Page et al. | 60/298 |
| 2003/0074888 A1 | 4/2003 | Jobson et al. | |

FOREIGN PATENT DOCUMENTS

| | | |
|---|---|---|
| DE | 100 40 209 | 2/2002 |
| DE | 101 05 185 | 8/2002 |
| EP | 0 638 140 | 2/1995 |
| EP | 0 855 653 | 7/1998 |
| EP | 1 016 777 | 7/2000 |
| WO | WO 02/29218 | 4/2002 |

OTHER PUBLICATIONS

Gegenstromreaktor zur Entfernung oxidierbarer Aerosole aus Abluftstromen [Countercurrent reactor for removing oxidizable aerosols from waste air streams] BW-Plus-Research project No. 397007, concluding report Feb. 2001 (http://bwplus.fzk.de/berichte/SBer/PEF397007Ber.pdf) (to Follow).

* cited by examiner

METHOD AND APPARATUS FOR PURIFYING EXHAUST GASES

This application is a national stage completion of PCT/EP2004/004793 filed May 6, 2004 which claims priority from European Application Serial Number EP 03010528.2 filed May 10, 2003.

FIELD OF THE INVENTION

The invention relates to a method for purifying exhaust gases comprising combustible and $NO_x$-containing exhaust-gas constituents. The invention also relates to an apparatus for purifying exhaust gases comprising exhaust-gas constituents which are combustible, contain $NO_x$ and/or are in particulate or soot form.

BACKGROUND OF THE INVENTION

Exhaust-gas streams often contain combustible pollutants in gas and/or particulate form and/or $NO_x$, i.e. nitrogen oxides. These are often produced at a relatively low temperature, and consequently heating to the temperature required for thermal or catalytic conversion of the pollutants is required. Heating of this type always requires high quantities of energy if the exhaust-gas streams are large and the pollutant concentrations are so low that combustion of the pollutants is unable to make any significant energy contributions. This applies in particular to the exhaust gas from internal combustion engines, where, during a cold start or when the engine load is low, the exhaust gases are produced at a temperature which is too low for the known catalytic exhaust-gas purification methods. This applies in particular to diesel engines or to spark-ignition engines which are operated in clean-burn mode.

According to the general prior art, it is preferable for what are known as autothermal exhaust-gas converters, in which the pollutants are burnt, with or without additional supply of heat, at a catalyst or in a combustion chamber and the hot exhaust gas is used to heat the cold feed, to be used for the exhaust-gas purification to remove gaseous, combustible constituents.

Furthermore, the engine exhaust-gas purification requires apparatuses for retaining and/or converting nitrogen oxides, preferably in lean-burn engines, and apparatuses for retaining and converting particulates, in particular soot particulates, preferably in diesel engines. The engine exhaust-gas train also includes apparatuses for muffling and if appropriate also for discharging heat, in order to limit the exhaust-gas temperature and/or to heat the passenger compartment.

According to the prior art as it stands at present, the various functions which have been mentioned above are realized by additive elements, such as primary catalyst, main catalyst, diesel soot filter, exhaust-gas cooler, muffler, and the exhaust-gas conditions which are required for these elements are primarily established by interventions in the electronic engine control. This entails high costs for the exhaust-gas train, problems with installation space and extensive linking to the engine control. This prevents the engine control from being optimized exclusively for optimum, low-consumption driving operations.

It is an object of the invention to provide a method showing how the different exhaust-gas treatment steps required for spark-ignition lean-burn engines and diesel engines can be combined in an autonomous and compact exhaust-gas treatment unit which is independent of the engine control, and which components and apparatuses can expediently be used to do so. For this purpose, in the text which follows, first of all the prior art relating to the individual components and the proposals which have been made hitherto for integrated engine exhaust-gas purification will be summarized. The invention will then be explained and substantiated with reference to the prior art.

Prior Art: Exhaust-Gas Heat Exchangers

What is known as autothermal reaction has long belonged to the prior art for the conversion of combustible exhaust-gas constituents in cold exhaust gases. In this procedure, the hot discharge from the reaction zone is used to preheat the cold feed. A separate supply of heat in the hot part of the exhaust-gas reactor is generally provided for starting up the cold reactor and to compensate for heat losses. Either recuperative/indirect or regenerative/direct heat exchange with a fixed heat accumulator is used for the heat exchange between the hot exhaust gas and the cold feed.

The regenerative heat exchange can be carried out very efficiently. It is particularly suitable for medium and high volumetric flows and requires periodic switching of the exhaust-gas streams. By contrast, the recuperative operation takes place continuously and is therefore also eminently suitable for low and medium exhaust-gas streams. In practice, by way of example, tube-bundle heat exchangers are used for this purpose; these are complex to produce in particular if a high quality of return heat transfer is to be achieved. Parallel-passage heat exchangers in the form of plate-type heat exchangers are more suitable. These can also be combined with a reaction unit for the catalytic converters.

With regard to parallel-passage heat exchanger reactors of this type, reference is made to EP 0 638 140 B1, U.S. Pat. No. 6,207,116 B1, EP 1 016 777 A2, EP 0 855 653 B1 and DE 100 40 209 A1, which describe passage arrangements in which a catalyst which is suitable for exhaust-gas purification may be arranged either on the wall or on additional structures in the passages.

Plate-type heat exchangers are generally designed with elastic seals between the individual plates. The required sealing pressure is achieved by means of tie-rods between the solid end plates. Designs of this type are unsuitable for catalytic or thermal exhaust-gas purification, on account of the high temperatures that occur and for weight reasons.

Continuously welded or soldered plate-type heat exchanger arrangements have been disclosed, for example, for fuel cell systems with integrated fuel reforming. They avoid the need for elastic seals and solid endplates, but the large number of welded or soldered seams are expensive and susceptible to faults. Moreover, the multiple flow diversion in conventional plate-type heat exchanger arrangements leads to a pressure loss which is unacceptable for exhaust-gas purification and possibly also to uncontrolled deposition and blockage caused by exhaust-gas constituents in particulate form.

The parallel-passage concepts described in U.S. Pat. No. 6,207,116 B1 and EP 0 855 653 B1 are distinguished by simple separation of the passages by a concertina-like folding and a simple flow guidance. However, in these concepts, the design of the baseplates and the seal between the passages and the outer housing required there has proven difficult in design and manufacturing technology terms. Moreover, the flow diversion at the entry and exit leads to an increased pressure loss. Although U.S. Pat. No. 6,207,116 B1 describes an embodiment which avoids the base sealing by flow division, in this arrangement it is necessary to provide two of all the installation elements. In addition, the profiling of the partition walls which is required there leads to an additional pressure loss. As our own tests have shown, the lateral inlet and the profiling of the folding can also lead to increased accumulation of soot and premature blockage. This situation is exacerbated if this blockage occurs in the cold feed region and cannot be eliminated by soot burn-off initiated by the supply of heat in the diversion.

For these multifarious reasons, the proposed plate-type heat exchanger concepts have not hitherto gained widespread acceptance in catalytic or thermal exhaust-gas purification practice. An additional factor for the automotive industry was the additional weight and pressure loss, and consequently these solutions have not thus far entered any form of series production.

Prior Art: Heat Source

Even when using an efficient exhaust-gas heat exchanger, a heat source, which heats the region of the exhaust-gas converter which is crucial for the pollutant conversion to a temperature required for the conversion, is required at least to start up the cold exhaust-gas converter. Hitherto, in stationary autothermal exhaust-gas purification installations, this heating has been effected either electrically or by an auxiliary burner, the hot exhaust gas from which is fed to the hot side of the exhaust-gas heat exchanger.

On account of the return heat transfer, the power of the additional heating in autothermal exhaust-gas purification installations can be greatly reduced or switched off, even with a cold feed, as soon as the reaction region of the converter has reached its operating temperature.

Autothermal reaction in combination with a supply of heat has also been proposed numerous times for the purification of the exhaust gas from automobiles. For example, U.S. Pat. No. 6,207,116 B1, EP 1 016 777 A2, WO 02/29218 A1, DE 101 05 185 A1 and US 2003 0074888 A1 have disclosed a heat source in the hot part of the exhaust-gas heat exchanger, which may be designed in the form of an electrical heating means, a fuel burner or a hot-gas feed. The heat source in the hot part of an exhaust-gas heat exchanger can therefore be regarded as an integral part of any autothermal exhaust-gas treatment unit.

In series-production motor vehicles, however, the catalyst has hitherto been heated exclusively by means of the hot engine exhaust gas. For this purpose, a hot exhaust gas, which quickly heats up the catalyst, is generated in the exhaust pipes upstream of the exhaust-gas converter, for example by means of the engine control and/or by postinjection and ignition of fuel. Electrically heatable primary catalysts are also used. A fuel-rich exhaust gas is ignited at the primary catalysts after an engine cold start. The heat which is released in the process subsequently heats the main catalyst.

A drawback of these concepts is the fact that the heat which is introduced or released does not, as in the autothermal concepts, remain largely in the hot part of the converter, but rather is discharged, resulting in increased energy consumption. This applies in particular to low-load operation of diesel and spark-ignition lean-burn engines, in which the exhaust gas is generally at a temperature which is too low for pollutant conversion.

Prior Art: $NO_x$ Conversion

A common feature of all the methods known for conversion of $NO_x$ into molecular nitrogen is that they only produce usable results at relatively high temperatures (above 250° C.). In many operating modes, the exhaust-gas temperatures of spark-ignition lean-burn engines, and in particular diesel engines, are often lower than these levels, consequently hitherto the engine control has had to intervene if the temperature range required for pollutant conversion is to be reached. This leads to increased fuel consumption.

In the concepts which have been developed thus far, the reducing agent which is required for most $NO_x$ conversion methods is either released from an auxiliary substance which is additionally carried in the vehicle, such as for example urea, or is generated by engine measures, such as for example postinjection, in the engine or in the hot exhaust pipe, so that a reducing exhaust gas is temporarily formed. The urea variant requires additional outlay for refueling, storage and conversion. Generation by postinjection leads to an increased fuel consumption, since the excess oxygen of all the exhaust gas has to be consumed by the postinjection.

In what is known as the storage catalyst concept, the reducing agent CO and $H_2$ has hitherto generally been generated by the engine control briefly adjusting engine operation in such a way as to form a rich (reducing) exhaust gas with a high CO and $H_2$ content. This likewise leads to increased fuel consumption and may therefore disadvantageously restrict the driving dynamics. Moreover, in the case of sulfur-containing fuel, what is known as sulfur regeneration is also required at relatively spaced-apart intervals in NOx storage catalysts; during this sulfur regeneration, the catalyst has to be heated to temperatures of from 650 to 750° C. under reducing conditions. This increasing of the temperature has also hitherto been affected exclusively by way of the engine control.

Even in the exhaust-gas purification concepts with integrated heat exchange and dedicated heat source which have been disclosed hitherto, the reducing conditions with a high CO and $H_2$ content which are required for the regeneration of the storage catalyst have always been set by means of the engine control. For example, DE 101 05 185 A1 and US 2003/0074888 A1 have described exhaust-gas treatment units with storage catalyst and integrated heat source, with the heat source being used exclusively to set the required temperature range.

Prior Art: Particulate or Soot Filtering and Filter Regeneration

The standard method for separating off particulate constituents is filtering. Since the filter becomes blocked as a result, it has to be regenerated at periodic intervals or continuously. If the particulates are combustible, an obvious procedure is to burn off the filter loading. This can take place either at periodic intervals, by the filter temperature for this purpose briefly being increased to above the ignition temperature of the particulate, or continuously, by the filter always being operated at a temperature which is sufficiently high for the particulates which are deposited to burn off more quickly than they are delivered.

Both options are used for diesel particulate filtering. For this purpose, the deposition usually takes place on porous ceramic monoliths, in which the untreated-gas passages and purified-gas passages are arranged in checkerboard fashion in the monolith. The purified-gas passages are closed off at the filter inlet and the untreated-gas passages are closed off at the filter outlet, so that the filtering takes place through the porous passage walls.

Continuous filter burn-off is possible substantially without problems if the untreated-gas temperature is sufficiently high. With standard diesel exhaust gas, the minimum temperature required is of the order of magnitude of 600° C. The required burn-off temperature can be reduced to below 400° C. by the addition of additives to the fuel or by prior catalytic oxidation of NO and utilization of the $NO_2$ which is formed for soot burn-off.

However, since the exhaust gas is significantly colder in particular in the low-load range, considerable additional energy would be required to raise the exhaust gas to these temperatures without return heat transfer.

Therefore, many diesel filter concepts provide for the exhaust gas to be heated to the ignition temperature only at periodic intervals when a sufficient filter loading has built up. These concepts function satisfactorily whenever the regeneration is triggered at an optimum filter loading level. If the filter loading level is too low, there is a risk of incomplete ignition and incomplete burn-off, with the result that the loading level is too high during the next regeneration. If the filter loading level is too high, there is a risk of the development of a burn-off front with an uncontrollable maximum temperature, at which the filter and, in certain circumstances, even the entire vehicle is destroyed.

As our own tests have shown, a burn-off front with an uncontrollable maximum temperature rise can occur whenever the incoming flow into the filter is in the same direction as the outgoing flow and the burn-off is ignited by increasing the temperature of the incoming gas. On account of the inherent risks of burn-off, diesel soot filters are currently only used with extensive precautionary measures in series-production vehicles.

In addition to the abovementioned ceramic filters, numerous filter variants have been described in which surface deposition, if appropriate assisted by electrostatic charging and agglomeration of the particulates, is to be effected.

The prior art had also disclosed the combination of a particulate filter with a countercurrent heat exchanger (Opferkuch, Gaiser, Eigenberger: "Enffernung oxidierbarer Aerosole aus Abluftströmen" [Removal of oxidizable aerosols from waste air streams], FZKA-BWPLUS 8 (1998), http://www.bwplus.fzk.de) and "Gegenstromreaktor zur Entfernung oxidierbarer Aerosole aus Abluftströmen" [Countercurrent reactor for removing oxidizable aerosols from waste air streams] BW-Plus-Research project No. 397007, concluding report February 2001 (http://bwplus.fzk.de/berichte/SBer/PEF397007Ber.pdf). In this case, the particulate filter is arranged in the hot part of an exhaust-gas heat exchanger and is held, by a heating apparatus upstream of the filter, at a temperature which is sufficiently high for the particulates which are separated out to be completely burnt on account of the increased residence time. The method described can also be used to periodically regenerate the filter by periodically increasing the filter entry temperature. However, the incoming flow is in the same direction as the outgoing flow, with the result that the above-described uncontrollable temperature rise during the periodic soot burn-off can occur. WO 02/29218 A1 also describes the integration of a filter element in the hot part of a countercurrent heat exchanger. It emerges from the description that this is evidently to involve surface deposition on the profiled walls of the flow passages, which may be boosted by a filter mat arranged between the walls. As has already been explained above under the heading "Prior Art: Exhaust-gas heat exchangers", this design can lead to rapid blockages in the cold part during diesel particulate filtering.

For these multifarious reasons, the automotive industry is still heavily engaged in looking for technologically simple solutions which allow successful separation of soot and reliable soot filter regeneration with a low pressure loss and a low additional energy consumption.

Prior Art: Integration of Automobile Exhaust-Gas Components

The various components used for the exhaust-gas treatment of engine exhaust gas by now represent a significant part of the costs of the drive train. In addition to the exhaust-gas catalyst, the $NO_x$ catalyst and the diesel soot filter, these components also include the exhaust-gas muffler and possibly also devices for heating the passenger compartment or stationary heating.

If the operation of the automobile exhaust-gas converter, as is currently standard, is influenced by the engine control, it has under certain circumstances proven necessary to divide the catalyst into a number of units and for these units to be arranged close to and away from the engine. This contributes to further increases in costs and possibly also to an increase in weight.

By contrast, combining all the required units to form a single exhaust-gas module and controlling it autonomously so as to be independent of the engine control, would have cost, functional and possibly also weight advantages.

However, this type of combination has hitherto appeared only partially possible. For example, as described above, both the integration of automobile exhaust-gas catalysts, of $NO_x$ storage catalysts or of soot filters in the correspondingly temperature-controlled parts of an exhaust-gas heat exchanger has been proposed, with the additional energy required being supplied electrically or by means of a fuel burner. However, in both DE 101 05 185 A1 and US 2003/0074888 A1, it is assumed that the reducing and CO- and/or $H_2$-containing atmosphere required for the regeneration of the $NO_x$ storage catalyst has to be set by altering the engine control with postinjection in the cylinder or the adjoining exhaust pipe. The descriptions of US 2003/0074888 A1 and WO 02/29218 A1 likewise assume that, as has hitherto been the case, a plurality of separate exhaust-gas treatment components, such as primary catalyst and main catalyst, are present and these components cannot be operated independently of the engine control.

SUMMARY OF THE INVENTION

Therefore, it is an object of the present invention to provide a method for purifying exhaust gases comprising combustible, $NO_x$-containing exhaust-gas constituents which may be in particulate or soot form, which allows all the subsystems which are required for pollutant conversion and if appropriate also for exhaust-gas muffling and the discharge of exhaust-gas heat to be combined in a single, compact unit and to be operated under the conditions required for the pollutant conversion independently of the control of the internal combustion engine.

A further object of the invention is to develop suitable apparatuses for this method, which are of simple construction in terms of design and manufacturing technology and enable the various functions required to be integrated in a single unit.

According to the invention, this object is achieved by the features described in the claims.

The basis of the invention is formed by a method for purifying $NO_x$-containing and possibly particulate engine exhaust gases. It integrates the following functions in a common exhaust-gas treatment unit, which is operated by a dedicated control, independently of the engine control, in such a way that the respectively optimum conversion conditions are set in the exhaust-gas treatment unit.

The first function is an efficient heat exchange, which is not susceptible to blockages and involves only a low pressure loss, between the incoming engine exhaust gas and the engine exhaust gas which leaves the unit. It is expediently realized as a parallel-passage countercurrent heat exchanger with incoming flow in the axial direction and substantially smooth passages. The second function is the removal and/or catalytic conversion of the harmful pollutant components. This is carried out in a known way by catalysts and/or filters which are integrated in or connected to the heat exchanger. The third function is the supply of heat. This is effected jointly with the fourth function, namely the periodic setting of reducing exhaust-gas conditions with a significantly increased CO and H$_2$ content. For this purpose fuel is mixed with air or an oxygen-containing exhaust gas and partially or completely oxidized at an electrically heatable catalyst. The gas which is formed in this way is admixed to the exhaust gas at the hot end of the exhaust-gas heat exchanger where the exhaust gas passes from the inflow passages into the outflow passages. The fifth function is the automatic control of the setting of temperature and composition of this admixed stream, in such a way that after a cold start the catalytically active region is quickly heated to the temperature required for pollutant conversion, the deNOxing catalyst, which is preferably designed as an NO$_x$ storage catalyst, is periodically regenerated, and sulfate is also removed at less regular intervals, and if necessary the conditions required for soot filter regeneration are set. For this purpose, the control unit may be provided with corresponding sensors and actuators. Two further objects may additionally be included: the integration of a heat exchanger for heating air for heating the passenger compartment of the vehicle, and exhaust-gas muffling, for example by active or passive elements for acoustic sound attenuation.

Although there are solutions for each one of the abovementioned objects individually, the combination of these solutions in the common exhaust-gas treatment unit described is novel and forms the core of the claimed method.

The devices and apparatuses described below which are expediently used to implement the abovementioned method are likewise novel. These are various embodiments of a parallel-passage heat exchanger with an axial incoming flow which is not susceptible to blockages and involves little pressure loss, of particulate filters with a new form of flow guidance and reliable regeneration properties, and for the integration or combination of the heat exchanger with the particulate filtering and for the integration of all the components in a single, common apparatus unit.

BRIEF DESCRIPTION OF THE DRAWINGS

The basis of the invention and its expedient configurations are illustrated in outline form and explained below with reference to the drawings, in which.

DETAILED DESCRIPTION OF THE DRAWINGS

Figure 1:
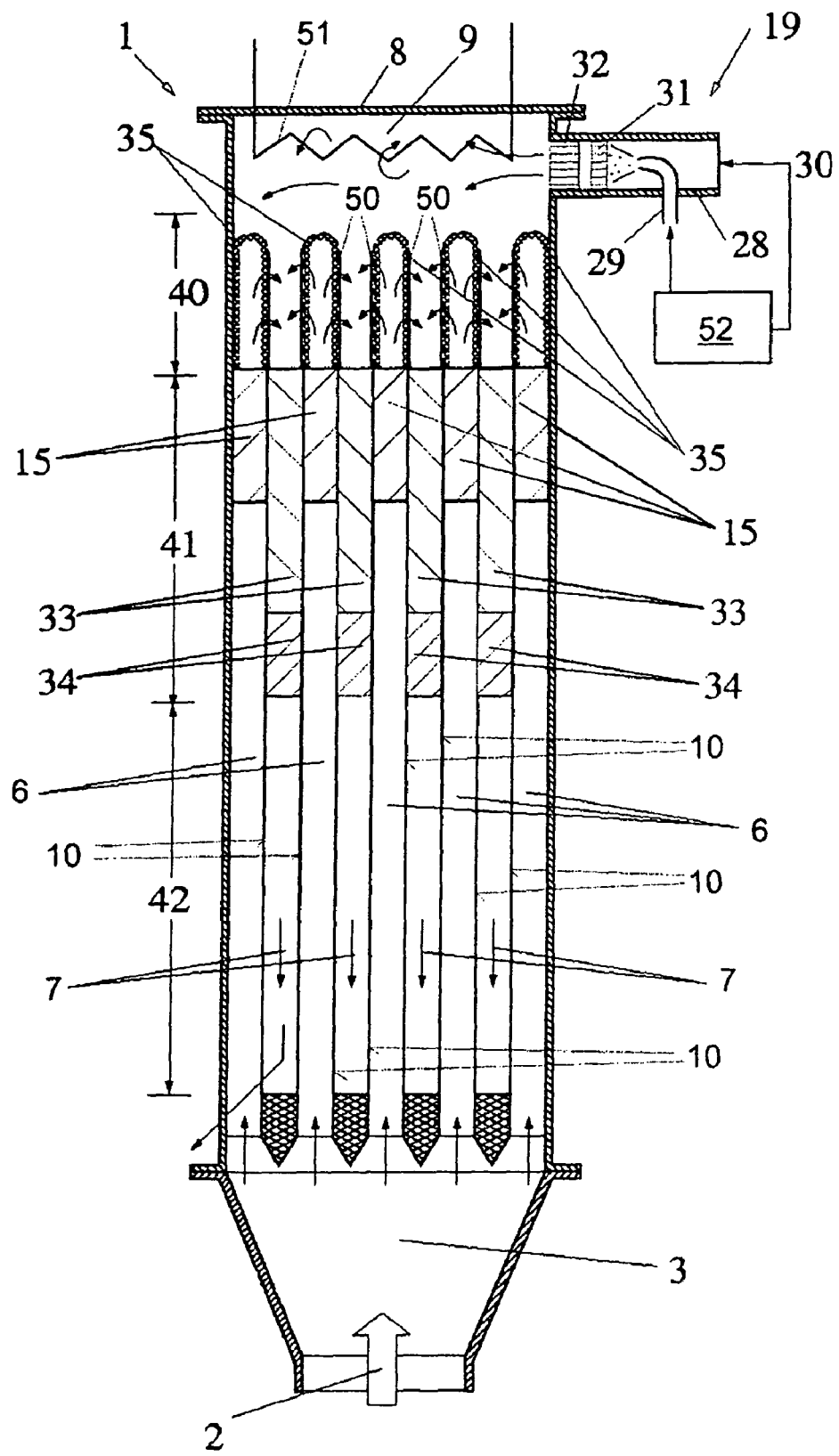
FIG. 1 shows a diagrammatic drawing which shows the arrangement of the individual components of the exhaust-gas treatment unit according to the invention based on the example of diesel exhaust-gas purification.

The following description of the invention is divided into
an explanation of the method according to the invention,
an explanation of the apparatus concept according to the invention and of expedient variants of the exhaust-gas heat exchanger,
a description of embodiments of the heat sources according to the invention and their use to provide heat and reduce exhaust gas,
the description of the configuration of the nitrogen oxide conversion in accordance with the invention using the NO$_x$ storage catalyst concept, and its integration in the exhaust-gas converter,
the description of a number of variants according to the invention for the separation and conversion of combustible, particulate exhaust-gas constituents, such as diesel soot, and their integration in the exhaust-gas converter, and the description of a novel design principle for a particulate filter with a burn-off characteristic which is more reliable than previous filters,
the description of the integration of different exhaust-gas treatment functions in an exhaust-gas converter according to the invention.

Generally Claimed Method

The general method principle is explained with reference to FIG. 1 on the basis of the example of diesel exhaust-gas purification. An exhaust-gas stream 2 which originates from an internal combustion engine (not shown) passes via an inlet 3 into an exhaust-gas converter 1 and is divided between a plurality of inflow passages 6. Here, it is heated by the exhaust gas flowing in the opposite direction in outflow passages 7. The required conversion reactions, in the example under consideration oxidation of NO to form NO$_2$ at catalyst 15, storage reaction of NOx or the storage regeneration at the catalyst 33 and postoxidation at catalyst 34, take place at catalysts 15, 33 and 34 arranged in the inflow and outflow passages. Particulates in soot form are removed in the soot filter 35, after which the exhaust-gas stream passes from the inflow passages 6 into the outflow passages 7 and leaves the latter, as shown in FIG. 2, laterally through an outlet 4 in the vicinity of the inlet 3. The structure which has been described thus far therefore comprises a filter region 40, a catalyst region 41 and a pure heat exchanger region 42, which may overlap one another.

A catalytic burner 19, in which an oxygen-containing stream (air and/or engine exhaust gas) 30 is mixed with fuel 29 and either partially oxidized to form the CO and H$_2$ or completely burnt at an electrically heatable precious-metal catalyst 31 and a subsequent unheated catalyst 32, is connected to an upper diversion region 9. The hot gas which emerges from the burner is admixed to the exhaust gas in the diversion.

If necessary, heat can be extracted from the region of the upper diversion by means of a heat exchanger 51 in the region of a hood 8 and used, for example, to preheat heating air. Alternatively, the heat exchange may also be arranged in an extraction passage (not shown), via which some of the gas is extracted from the hood 8 and discharged to atmosphere.

A control unit 52 is used to control the feed of oxygen-containing gas 30 and fuel 29 to the catalytic burner 19 in such a way that the required operating conditions, which vary over the course of time, are always set in the exhaust-gas treatment unit. This can take place by partial or complete combustion of the fuel which is supplied, with the burner outlet being admixed to the exhaust gas in the region of the diversion. Direct heating of the regions which are crucial for pollutant conversion and retention may also take place reactively, by the components (CO and $H_2$) generated during the partial oxidation in the burner 19 being catalytically oxidized by the oxygen-containing exhaust gas in the outflow passages 7.

General Apparatus Design Concept and Exhaust-Gas Heat Exchange

The text which follows illustrates the apparatus designed with reference to FIG. 2 and provides a more detailed explanation in FIGS. 3 to 14.

FIG. 2 shows the apparatus for purifying exhaust gases in the form of the exhaust-gas converter 1, which is used to convert combustible, gaseous and $NO_x$-containing constituents in the exhaust-gas stream 2, which is indicated by arrows. For the sake of clarity, not all the arrows which denote the passage of the exhaust-gas stream 2 are marked by reference numeral 2. The exhaust-gas converter 1 is preferably connected to an internal combustion engine, which is likewise not shown.

The exhaust-gas converter 1 has the inlet region 3, via which the exhaust-gas stream 2 is fed to the exhaust-gas converter 1, and the outlet region 4, which is used to discharge the exhaust-gas stream 2 from the exhaust-gas converter 1. The inlet region 3 and the outlet region 4 are designed as openings in a housing 5, consisting for example of stainless steel, which likewise forms part of the exhaust-gas converter 1.

A plurality of inflow passages 6 and a plurality of outflow passages 7, located between the inflow passages 6, are arranged within the housing 5. In this arrangement, the inflow passages 6 are connected to the inlet region 3 and the outflow passages 7 are connected to the outlet region 4. The inflow passages 6 and the outflow passages 7, as shown in FIG. 4, are arranged in a parallel-passage arrangement 16 comprising a sequence of the inflow passages 6 and the outflow passages 7 within the housing 5, and together with the housing 5 form an exhaust-gas heat exchanger 12.

The exhaust-gas stream 2 is fed to the inflow passages 6 from the inlet region 3 in the axial direction. It emerges at the opposite end of the inflow passages, is diverted in a diversion region 9 delimited by a hood 8 of the housing 5 and then flows back in the outflow passages 7 in countercurrent to the incoming gas. The main direction of flow of the exhaust-gas stream 2 in the outflow passages 7 is therefore substantially opposite to the main direction of flow of the exhaust-gas stream 2 in the inflow passages 6. The exhaust-gas stream 2 then leaves the housing 5 in the lateral direction via the outlet region 4 just above the inlet region 3.

Figure 3:
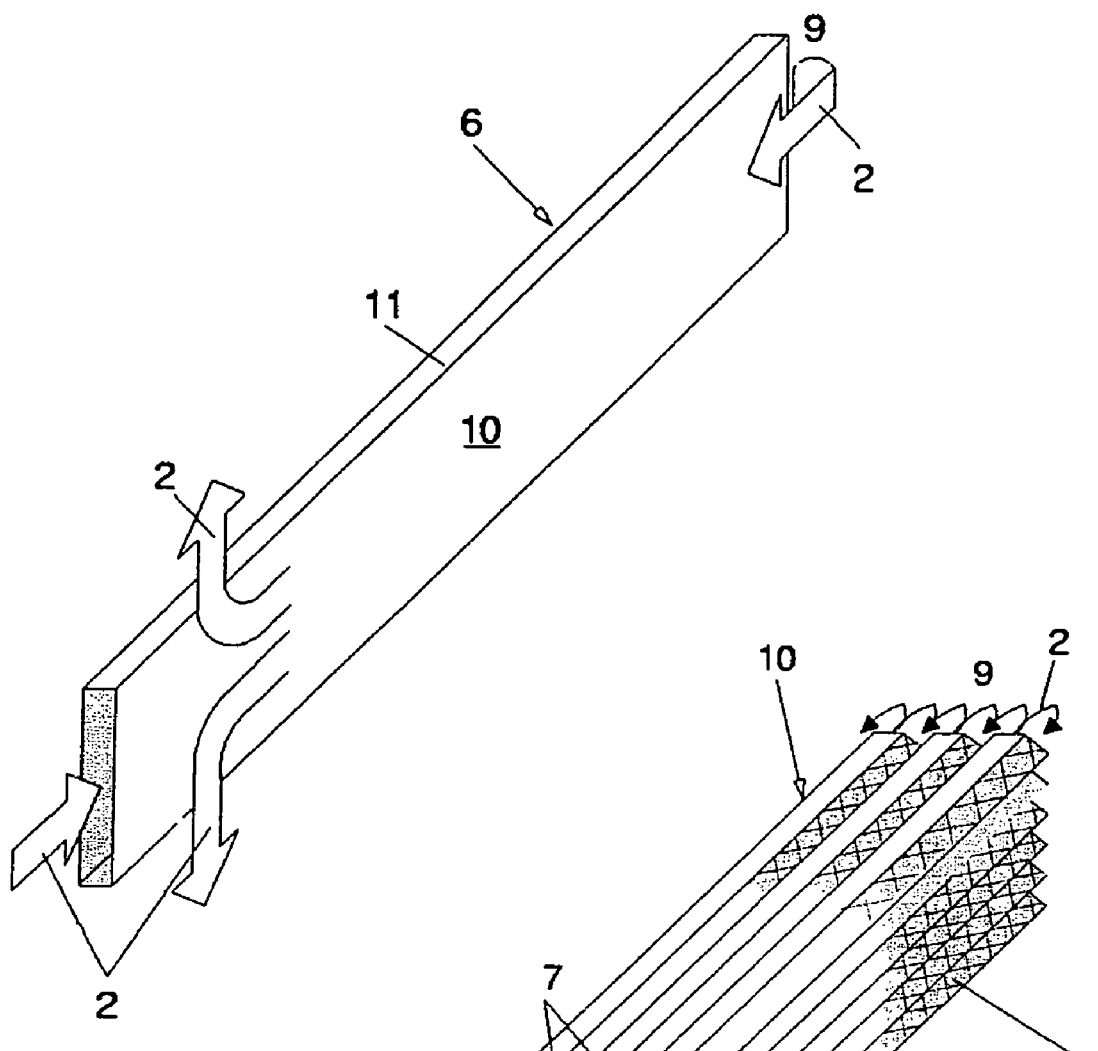
FIG. 3 shows an inflow passage of the exhaust-gas converter from FIG. 2.

FIG. 3 illustrates an individual inflow passage 6. In this case, this passage is in a flat, rectangular form, and is closed off on two sides by lateral walls 10 and on two sides by end faces 11. The inflow passages 6 can therefore be regarded as substantially smooth passages which are closed at all sides on their lateral surface, and are in this way separated from the outflow passages 7. The two further sides of the inflow passages 6 are of course open and, as mentioned above, lead in one case to the inlet region 3 and in the other case to the diversion region 9. The inflow passages 6 may also take other forms, some of which are described with reference to FIGS. 4, 5, 6, 7, 13, 14 and 20, which also reveal a few examples of possible ways of producing the inflow passages 6.

Figure 4:
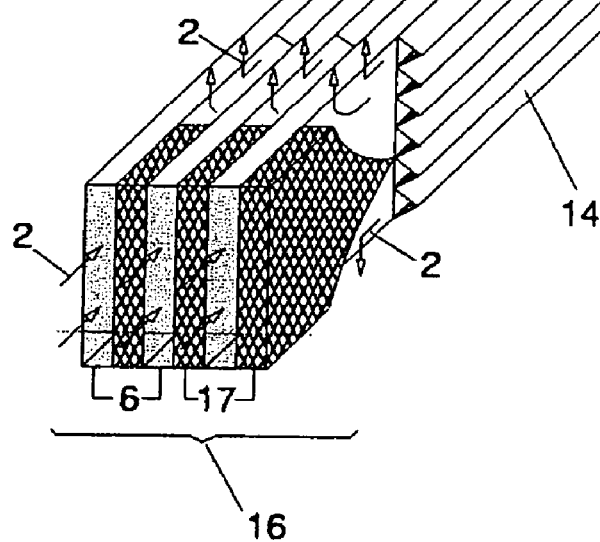
FIG. 4 shows the inflow and outflow passages of the exhaust-gas converter from FIG. 2.
Figure 5:
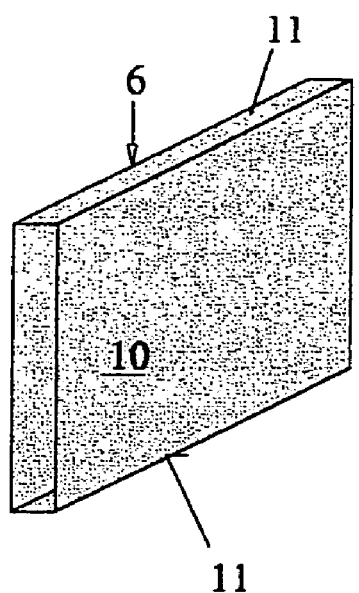
FIG. 5 shows a first possible way of forming the inflow passage.

FIG. 4 shows the arrangement of the outflow passages 7 with respect to the inflow passages 6. It can be seen from that figure that the outflow passages 7 are in each case formed by the side walls 10 of adjacent inflow passages 6. As can be seen from FIG. 1, the end faces of the outflow passages 7 are formed by the housing 5, so that the outflow passages 7 do not themselves have any walls of their own, but rather are merely formed by gaps or spaces between the inflow passages 6. The outflow passages 7 can therefore be regarded as open passages.

In the interior of the inflow passages 6 there are respective spacer elements 14, which are used to strengthen the exhaust-gas converter 1 and to improve the heat transfer on account of the larger heat-transfer surface area and the fin action which they produce, and are suitable as a support for catalysts 15. The spacer elements 14 are also able to distribute the exhaust-gas flow 2 in the transverse direction, in particular in the inlet region 3 and in the outlet region 4. Of course, a very large number of different forms can be used for the spacer elements 14; in this case, a preferred structure is formed by metal sheets which have been profiled into a corrugated form. The spacer elements 14 are then preferably installed in such a way that the corrugation peaks or valleys run in the direction of flow of the exhaust-gas stream 2 and ensure that the through-flow involves little pressure loss and is not susceptible to deposits. In principle, the spacer elements 14 may be formed both integrally with the side walls 10 and as separate components. Furthermore, it is also possible for them to be arranged within the outflow passages 7.

The catalysts 15, which in FIGS. 2 and 4 are illustrated only as a coating on the spacer elements 14, effect the catalytic reaction of the pollutants in the exhaust-gas stream 2, which takes place in a manner known per se and therefore is not described in more detail here. The catalysts 15 can in principle be arranged on the inner and/or outer side of the side walls 10 or the end faces 11, on the spacer elements 14 or laid, for example, as a bulk bed in the inflow passages 6 and/or the outflow passages 7 at the locations at which the temperature range which is most favorable for the respective conversion is established. The same is also true of the storage materials and particulate filters, which for better conversion of the pollutants may be arranged on the inner side and/or outer side of the walls 10 and the end faces 11 and on the spacer elements 14 in addition to or instead of the catalysts 15, and which will be dealt with in more detail below.

Further spacer elements 14, which are used in particular for a thin and planar design of the lateral walls 10 of the inflow passages 6, are arranged in the outflow passages 7 and within the outflow passages 7 extend from one inlet passage 6 to the next inlet passage 6, so that the outflow passages 7, even without having their own walls, represent a rigid structure. During production of the exhaust-gas converter 1, a plurality of inflow passages 6 with spacer elements 14 are stacked on top of one another in such a way that the spaces in which the open outflow passages 7 are produced are formed between the closed inflow passages 6. A stack of closed inflow passages 6 and open outflow passages 7, known as the parallel-passage assembly 16 (FIG. 4), is surrounded by the outer housing 5, as can be seen from FIG. 2, and together with the housing 5 forms the countercurrent exhaust-gas heat exchanger 12.

A thermally stable sealing device 17, which ensures that a flow of gas from the inlet region 3 directly into the outlet region 4 is avoided or at least considerably minimized, is arranged between the inlet region 3 and the outlet region 4. The sealing device 17 may include mineral and/or graphite fiber materials and/or expanded clay and/or a casting compound, as well as a folded, welded and/or soldered connection. Between the housing 5 and the parallel-passage assembly 16 there is a flexible sealing device 18, which ensures a low-vibration position of the parallel-passage assembly in the housing 5.

The sealing device 17 is designed for a wide temperature range, which when the internal combustion engine is operating at a high load may exceed 600 to 700° C., and in addition to the sealing action also ensures a fixed connection between the parallel-passage assembly 16 and the housing 5. In general, complete gas tightness is not required, since a few percent of gas slippage or gas loss between the inlet region 3 and the outlet region 4 does not crucially affect the purification capacity of the exhaust-gas converter 1.

The fixed connection of the parallel-passage assembly 16 to the housing 5 between the outlet region 4 and the inlet region 3 means that the parallel-passage assembly 16 can expand independently of the housing 5 in the event of temperature changes.

There are numerous options for the structure and production of the inflow passages 6. They are preferably made from sheet metal, in particular a stainless steel sheet, which has the required properties with regard to temperature and corrosion resistance. Alternatively, the inflow passages 6 may also be made from ceramic, e.g. in tube form, which is fired shut or sealed with a sealing compound in the heat exchanger region 42.

FIGS. 5, 6, 7 and 8 show various embodiments for forming the inflow passages 6, which all consist of sheet metal. In the basic structure shown in FIG. 5, the inflow passage 6 is designed with a rectangular cross section and can be seamlessly welded or soldered.

Figure 6:
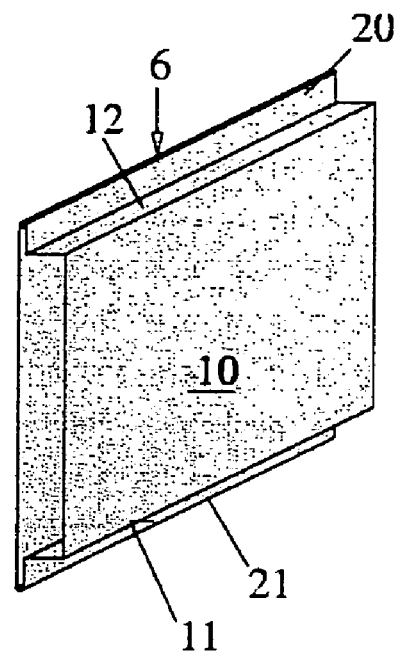
FIG. 6 shows a second possible way of forming the inflow passage.

The inflow passage 6 shown in FIG. 6 comprises one or more parts; in the present case, there is a longitudinal seam 20 between the lateral wall 10 and the upper end wall 11 and a longitudinal seam 21 between the lateral wall 10 and the lower end wall 11, both of which longitudinal seams are formed by bending over the sheet-metal material.

Figure 7:
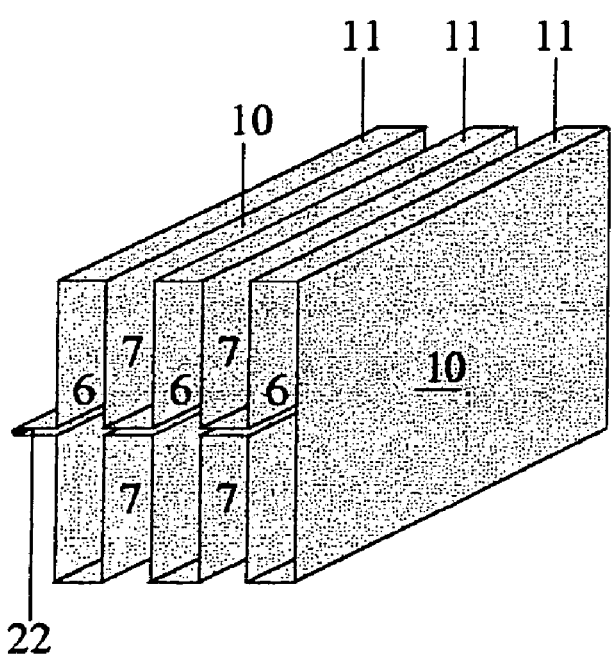
FIG. 7 shows a possible way of forming a plurality of inflow passages.

The structure of the inflow passages 6 illustrated in FIG. 7 has concertina-like multiple pockets which form the closed inflow passages 6. In this case too, an open outflow passage 7 is in each case provided between two successive inflow passages 6. In this case, a longitudinal seam 22 is provided in the middle region of the lateral wall 10 of the left-hand inflow passage 6, which longitudinal seam 22 could also be provided in the region of the lateral wall 10 of the right-hand inflow passage 6 instead of the continuous metal sheet which is present there. Therefore, the structure illustrated in FIG. 7 corresponds to the parallel-passage assembly 16, which in this case has three closed inflow passages 6 connected to one another and six open outflow passages 7 separated by respective center webs 23. Of course, it would also be possible to provide any other number of inflow passages 6 and outflow passages 7.

Figure 8:
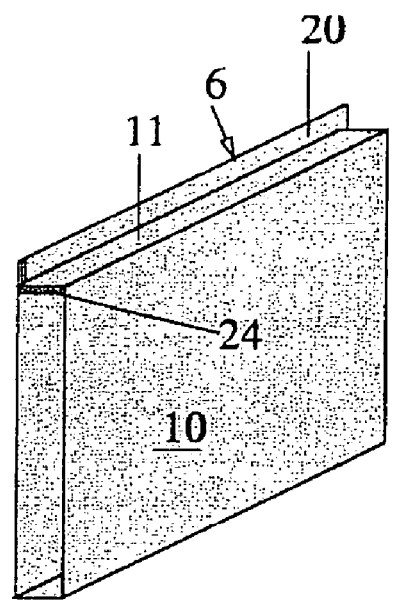
FIG. 8 shows a third possible way of forming the inflow passage.

In the embodiment of the inflow passages 6 shown in FIG. 8, to seal off the inflow passages 6, a sealing strip 24, which is combined with the upper longitudinal seam 20, can be provided in the region of the upper end wall 11. This gastightness of the inflow passages 6, which is already very good but is not absolute, can in this case be improved both by using the sealing strip 24 alone and simply by folding the longitudinal seam 20 alone and by means of a welded or soldered join.

The lateral walls 10 of the inflow passages 6 may either, as illustrated in FIGS. 4 to 7, be smooth, in which case it is then expedient for the spacer elements 14 to be placed in the inflow passages 6 and/or the outflow passages 7, in order to strengthen the exhaust-gas converter 1. According to the embodiment of the lateral walls 10 illustrated in FIG. 9, these walls are provided with a stamped structure which is such that the opposite lateral walls 10 are supported against one another and ensure good heat transfer, controlled flow guidance and good transverse mixing. In the embodiment illustrated, the walls 10 are stamped in corrugated form and have beads 25 running in the longitudinal direction. If the walls 10 which have been stamped with the obliquely running corrugations are folded together via the beads 25 running in the longitudinal direction, it is possible to produce an inflow passage 6 as illustrated in FIG. 8. This then has a stamped-in, crossed corrugation structure. It is in this way also possible to produce the parallel-passage assembly 16 shown in FIG. 7 or shown in FIGS. 13 and 14, which are explained in more detail below, by folding from a continuously stamped sheet-metal strip.

Figure 2:
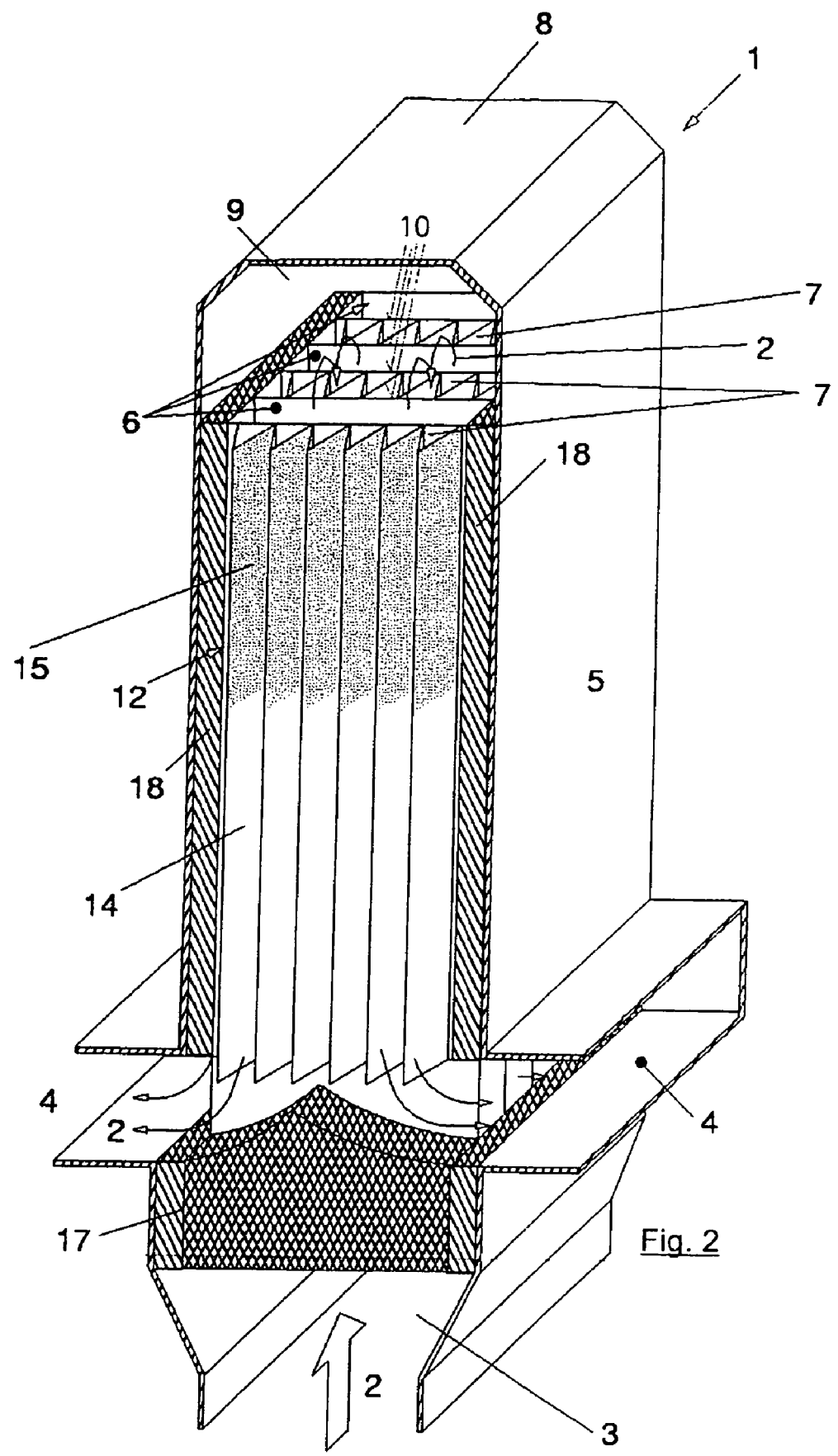
FIG. 2 shows a second embodiment of the exhaust-gas converter according to the invention.
Figure 9:
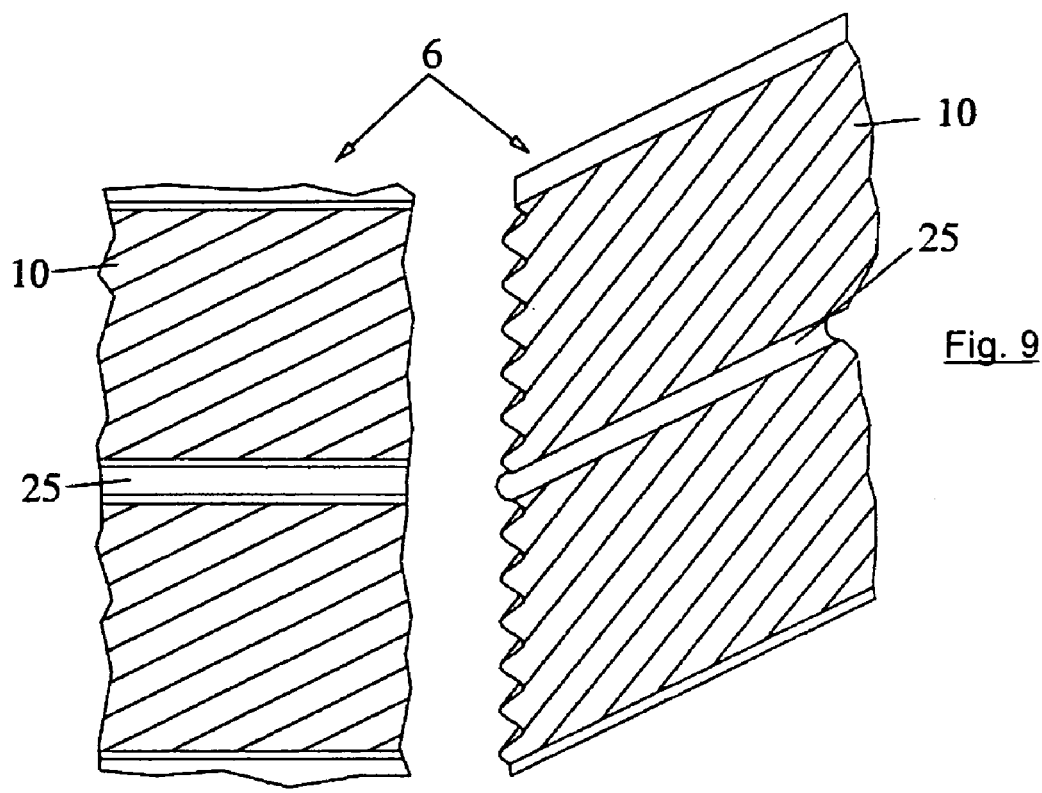
FIG. 9 shows a developed view of the side walls of an inflow passage.

A structure of this type in the state shown in FIG. 9 can in particular be provided with different catalysts 15 in sections, for example by spray coating, as is required for the exhaust-gas converter shown in FIG. 1. Folding and formation of the longitudinal seam 20 can then take place by folding, spot-welding, roller seam welding or laser welding, without unacceptable thermal stresses on the catalyst.

To prevent deposits of soot from causing blockages, in particular in the cold region, in the case of soot-containing exhaust gas, it is recommended to use a design with smooth walls as shown in FIGS. 5 to 8 and inserted, catalytically coated spacer elements 14.

Figures 10, 11:
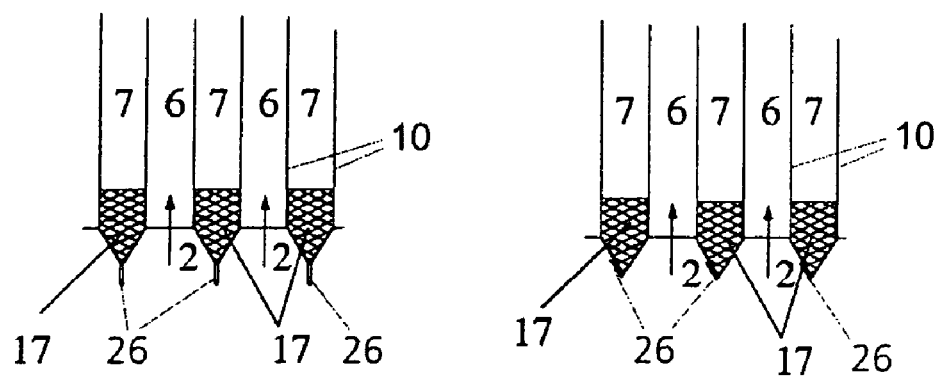
FIG. 10 shows a first possible way of forming the inflow region into the inflow passage.
FIG. 11 shows a second possible way of forming the inflow region into the inflow passage.
Figure 12:
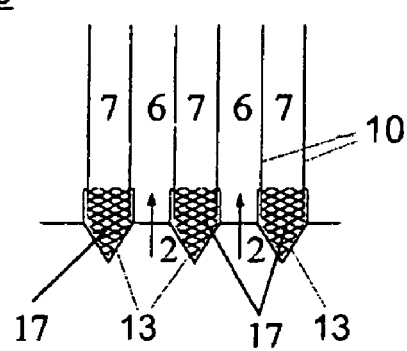
FIG. 12 shows a third possible way of forming the inflow region into the inflow passage.

To reduce the pressure loss in the exhaust-gas stream 2 in the inlet region 3 of the exhaust-gas converter 1 and the risk of blockages caused by deposition of soot, the inflow passages 6, in accordance with the embodiments shown in FIGS. 10, 11 and 12, can be designed with various entry shapes. In the embodiment shown in FIG. 10, the lateral walls 10 of successive inflow passages 6 are in contact with one another, which increases the size of the openings of the inflow passages 6. The lateral walls 10 of successive passages can in this case be joined to one another for example by spot-welding or linear welding.

Moreover, in the embodiment shown in FIGS. 10 and 11, the lateral walls 10 of the closed inflow passages 6 are extended beyond the actual entry to the inflow passages 6 in the direction of the inlet region 3, which leads to projections 26. During assembly of the parallel-passage assembly 16 as illustrated in FIG. 11, these projections 26 can be bent back over the correspondingly shaped sealing material of the sealing device 17, so as to produce incoming flow to the inflow passages 6 which is favorable in terms of flow. FIG. 12 shows an embodiment without the projections 26, in which the sealing material 17 is covered by caps 13 which are shaped favorably in terms of flow and are preferably made from metal sheet. In this case, the caps 13 may be clamped securely within the inflow passages 6, for example by spacer elements 14.

Figure 13:
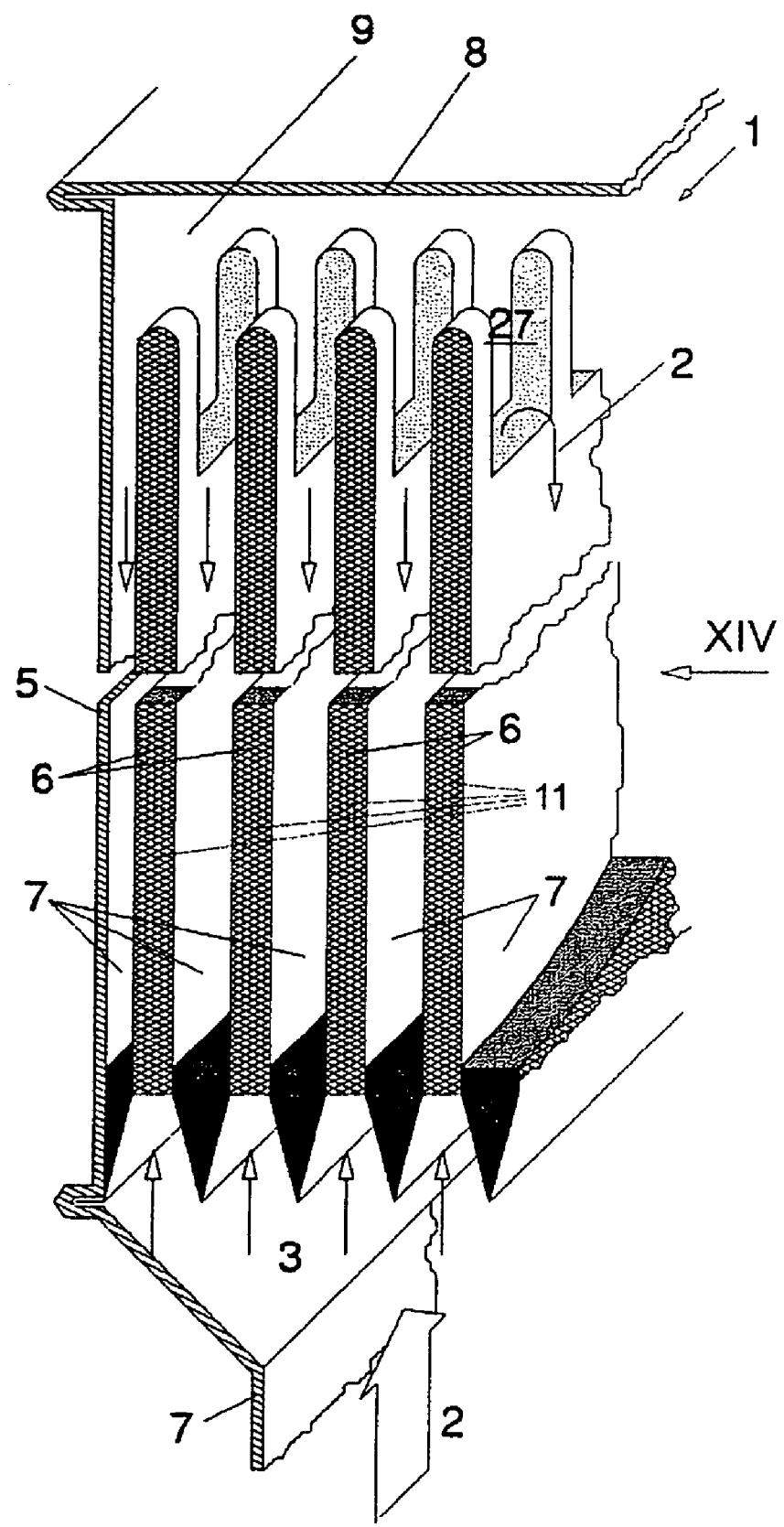
FIG. 13 shows a third embodiment of the exhaust-gas converter according to the invention corresponding to section XIII-XIII from FIG. 14.
Figure 14:
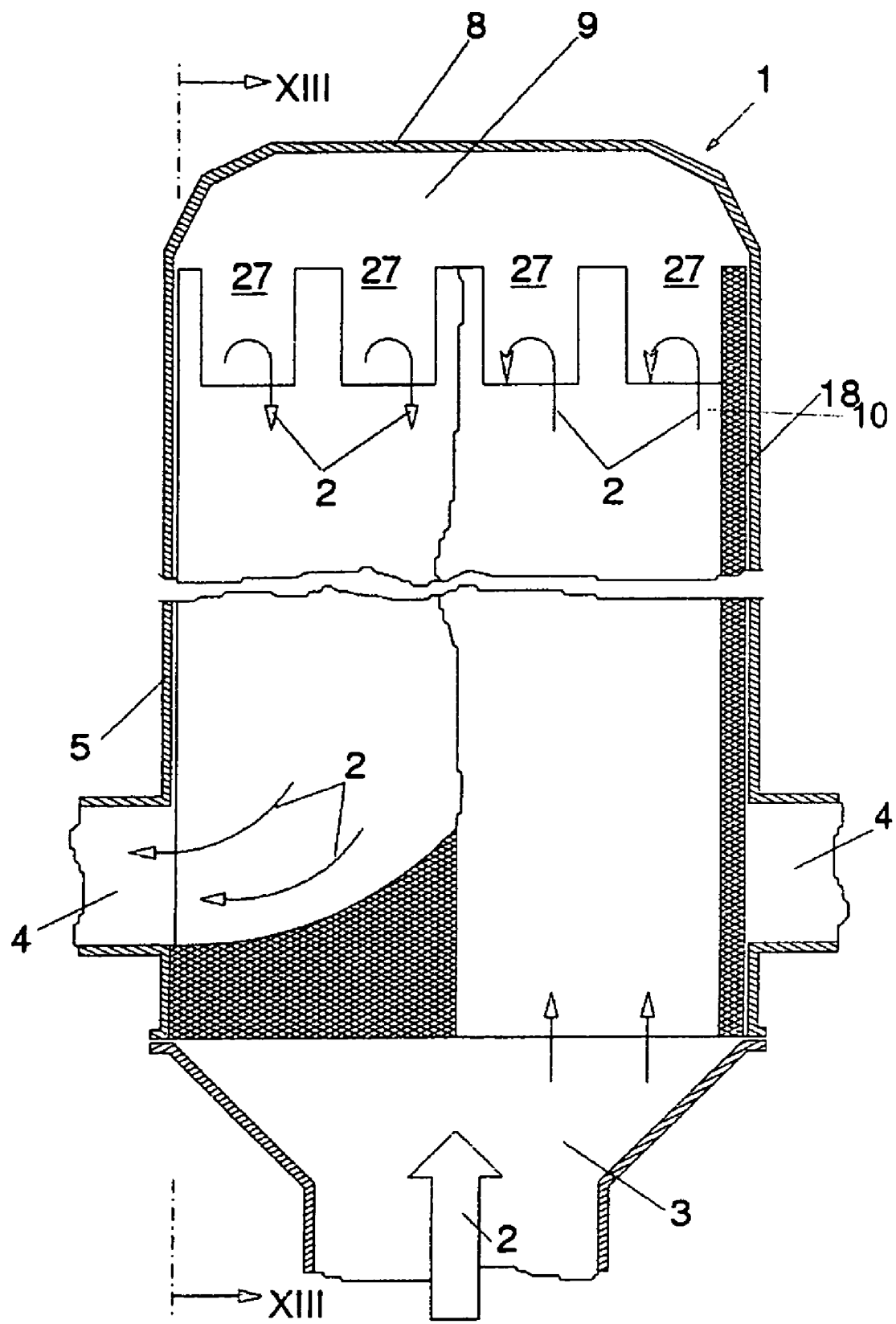
FIG. 14 shows a view in the direction of arrow XIV from FIG. 13.

A further possible way of constructing the parallel-passage assembly 16 is shown in FIGS. 13 and 14. In this case, the lateral walls 10 of the inflow passages 6 are folded upward and downward in meandering form, contrary to the illustration shown in FIG. 7, but not perpendicular to the direction of flow but rather parallel to it. The exhaust-gas stream 2 enters the pocket-like inflow passages 6, which are still open at their underside. They are sealed over the entire length of their end sides in the direction of the housing 5. In the diversion region 9, there are openings 27 in the lateral walls 10 of the inflow passages 6, through which openings the exhaust-gas stream 2 passes into the diversion region 9 or into the outflow passages 7. In this case too, the spaces which immediately adjoin the inflow passages 6 form the outflow passages 7, through which the exhaust-gas stream 2 flows back. As in FIG. 2, the surrounding housing 5 is laterally open at the bottom, in order to allow the exhaust-gas stream 2 to leave the exhaust-gas converter 1 via the outlet region 4. As an alternative to the continuous, multiply meandering folded wall illustrated here, which forms the lateral walls 10 and includes the openings 27, the parallel-passage assembly 16 shown in FIG. 13 and FIG. 14 may also comprise a plurality of walls which are merely folded at their underside and are open at the top. The form of the entry to the inflow passages 6 which is favorable in terms of flow can in this case be realized in a particularly simple way, as shown in FIG. 13.

In certain embodiments, in certain installation situations or for certain requirements, it may be expedient to reverse the direction of flow of the exhaust-gas stream 2, i.e. for the exhaust gas to be fed laterally to the outlet region 4 and therefore to the open outlet passages 7 and extracted at the inlet region 3. This applies to all the embodiments of the exhaust-gas converter 1 described herein, but this does not affect the basic operation thereof. However, in this situation, the flow to the inlet passages 6 is no longer in the axial direction.

Heat Source and Generation of Reducing Agent

As shown in FIG. 1, a catalytic burner 19, which is required in particular to start up the cold exhaust-gas converter 1 and to generate a reducing agent for the $NO_x$ catalyst, is arranged in the diversion region 9, with the heat being supplied by partial or complete combustion of fuel.

It is expedient for the catalytic burner 19, like what is known as an electrical catalyst, to be divided into an electrically heatable primary catalyst 31 and an adjoining main catalyst 32. To be started up and quickly heated up, it is operated with a lean (oxygen-rich) fuel/gas mix, the composition of which is set in such a way that the permitted thermal stressing of the material used is not exceeded. Suitable gases include air, oxygen-containing exhaust gas or a mixture of air and exhaust gas.

To generate a CO/hydrogen mix as chemical heat-transfer medium and as reducing agent for the conversion of nitrogen oxides, the catalytic burner 19 is operated with a rich (low-oxygen) fuel/gas mix, with the fuel being only partially oxidized. In this operating state, it may be appropriate to add water in order to limit the maximum temperature and to generate a hydrogen-rich reducing agent.

Therefore, according to the invention the catalytic burner 19 can be used to thermally heat the exhaust-gas converter 1 during a cold start, to set and maintain an optimum temperature distribution in the catalyst regions, to generate a CO/hydrogen mix as reducing agent for the $deNO_x$ catalysts or as chemical heat-transfer medium for a downstream catalytic oxidation, to ignite the burn-off of deposits in particulate form and for the high-temperature desulfurization of $NO_x$ storage catalysts described below. For this purpose, it is to be provided with a dedicated control unit 52 which alters the supply of air, exhaust gas and fuel as required.

FIG. 1 shows an embodiment of the heat supply device 19 in the form of the catalytic burner 19 for feeding heat into the diversion region 9 of the exhaust-gas converter 1. The catalytic burner 19 has a supply connection piece 28, into which fuel is injected via a fuel line 29 and then mixed with oxygen via a gas feed 30 and atomized. The supply connection piece 28 also contains the electrically heatable monolith catalyst or primary catalyst 31 and if appropriate also a further post-catalyst 32. The gas supply 30 may be an additional air stream or a partial stream of the (oxygen-containing) exhaust-gas stream 2. The fuel/gas mix is passed via the monolith catalyst 31 and 32, in the process is fully or partially oxidized and fed to the exhaust-gas stream 2 in the diversion region 9. The catalytic burner 19 is to be connected to the hood 8 of the housing 5 or the filter admission space 37 (FIG. 16) in such a manner that the fuel gas is supplied and distributed uniformly between all the outflow passages 7 or all the passages of the particulate filter 35. A distribution of this type may also be assisted by additional measures, such as for example perforated plates or metal guide sheets.

Nitrogen Oxide Conversion

A common feature of all methods which are known for conversion of $NO_x$ into molecular nitrogen is that they only achieve good conversion rates at temperatures around 300-400° C. In many operating ranges, the exhaust-gas temperatures of spark-ignition lean-burn engines and in particular diesel engines are often lower than these temperatures, and consequently the above-described, controlled and energy-efficient increase in the exhaust-gas temperature independently of the engine control is advantageous for all standard technical NOx reduction processes.

Particular benefits arise for what is known as the storage catalyst concept used for lean-burn engines, in which NO and/or $NO_2$ is stored in the catalyst in the form of alkali metal nitrate or alkaline-earth metal nitrate. Once the storage capacity is exhausted, the store has to be regenerated. For this purpose, a reducing exhaust gas with an increased CO and hydrogen content is generated for a short time. These components convert the nitrate back into oxide or carbonate. The $NO_x$ released reacts with hydrogen or CO to form nitrogen and water or $CO_2$.

As has already been explained, the reducing agent required for this purpose can in this case be generated by partial oxidation and/or reforming in the catalytic burner 19 of the exhaust-gas converter 1 rather than, as hitherto, by post injection in the engine. Therefore, an $NO_x$ conversion and/or storage catalyst 33 provided for this purpose is expediently arranged in the outflow passages 7 immediately downstream of the diversion region 9 if the reducing agent is added in the diversion region 9. The storage catalyst may be followed by an oxidation catalyst 34 with an oxygen storage capacity, in order to prevent unreacted CO and $H_2$ from breaking through during the regeneration phase.

If at least two substantially identical exhaust-gas converters 1 are operated in parallel, it is possible to carry out a method for purifying exhaust gases comprising $NO_x$-containing exhaust-gas constituents, in which the exhaust-gas stream through the unit to be regenerated is throttled during the period of regeneration of the $NO_x$ conversion and/or storage catalyst 33, so that the regeneration can be carried out with a considerably reduced consumption of regeneration agent.

The periodic provision of reducing agent by partial oxidation in the catalytic burner 19 results in periodic introduction of heat in the diversion region 9. The additional heat demand for heating the exhaust gas to the required conversion temperature can in this way be (substantially) covered according to the invention if the return heat transfer in the exhaust-gas heat exchanger 12 is made sufficiently effective.

In the case of the $NO_x$ storage catalyst 33, this supply of heat takes place only during the regeneration cycle of the $NO_x$ storage catalyst 33. Then, a temperature profile which fluctuates within a certain range is set at the $NO_x$ storage catalyst 33. This is an advantage for the functioning of the $NO_x$ storage catalyst 33, since the storage of $NO_x$ takes place in a usable way even at temperatures below 300° C., whereas temperatures of around 400° C. are advantageous for fast and complete regeneration. Moreover, the integrated heat exchange ensures that the cyclical supply of heat is retained in the hot part, so that the temperature in the $NO_x$ storage catalyst changes only slightly over the duration of a cycle.

The occasional high-temperature sulfur regeneration which may also be required in the $NO_x$ storage catalyst 33 can likewise be initiated by combustion of fuel by means of the catalytic burner 19.

The text which follows will deal with particulate filters 35, which can be dispensed with if the exhaust gas does not contain any particulates.

Particulate Filters and Their Regeneration

If the exhaust gas contains combustible particulates (spores, microorganisms, organic dust, soot, these particulates should remain in the hot region of the exhaust-gas converter 1 until they have been converted or completely burnt. To achieve this, their residence time generally has to be significantly longer than the gas residence time. According to the invention, this is achieved by delaying the transportation of particulates by frequent wall contact or by filtering them out with continuous or periodic burn-off on the particulate filter 35.

The solution according to the invention of an intrinsically reliable particulate filter burn-off can be implemented in a number of ways. One solution is for the particulate filter 35 to be operated for the entire time at such a high temperature that the residence time of the particulates is sufficient for them to be completely burnt off, so that there is no cumulative loading. This solution is recommended in particular if an oxidation catalyst, which oxidizes NO to form $NO_2$, is arranged upstream of the particulate filter, so that the filter burn-off is effected even at low temperatures by $NO_2$ in accordance with what is known as the CRT (continuous regeneration trap) method.

A second solution is for the burn-off to be effected by periodic supply heat at such short intervals that it is impossible for a high filter loading level to build up. On account of the efficient return heat exchange in the exhaust-gas converter 1 according to the invention, both routes are possible without a significantly increased supply of energy. Moreover, if the particulate concentration is high, the heat which is released during burn-off can cover the heat demand for the exhaust-gas heating which is required.

A third solution according to the invention consists in passing the gas flow through the particulate filter 35 in such a way that the increase in the filter temperature, with the downstream burn-off front, described at the outset does not occur. This is the case if the flow in the particulate filter 35 is diverted in such a way that a countercurrent or a cross-(counter) current is established between the gas flowing into the particulate filter 35 and the gas flowing out of the particulate filter 35.

This countercurrent implementation can be realized in a particularly simple way, on account of the countercurrent exchanger 12 which is already present in the exhaust-gas converter 1 according to the invention shown in FIGS. 1, 13 and 14, if the openings 27 in the inflow passages 6 in the diversion region 9 are closed off by filter material, so as to produce a particulate filter 35 from which the gas passes into the outflow passages 7. The outflow passages 7 are open toward the hood 8. According to the invention, there are a number of alternatives for igniting the burn-off:

1) The catalytic burner 19 is operated with excess air to ignite the burn-off. Then, hot fuel gas enters the outflow passages 7 from the burner 19, with the ignition of the filter burn-off always taking place in countercurrent with respect to the incoming exhaust gas.

2) The burner 19 is operated with substoichiometric quantities of air in order to ignite the burn-off. In this case, hot $CO/H_2$-containing gas enters the outflow passages on the rear side of the particulate filters 35. If an oxidation catalyst 50 is arranged there, as shown in FIG. 1, the supplied $CO/H_2$ mix burns at this oxidation catalyst and locally heats the particulate filter in a targeted way. Complete periodic soot burn-off without unacceptably high burn-off temperatures can be achieved by positioning the oxidation catalyst 50 and setting the $CO/H_2$ quantity by means of the burner 19 and the control unit 52.

The supply of heat required in order to initiate the burn-off for a periodic filter burn-off can be greatly reduced, in a similar way to in the regeneration of the $NO_x$ storage catalyst 33, by at least two identical exhaust-gas converter modules being operated in parallel, in which case the throughput through the particulate filter 35 to be regenerated is greatly reduced in order to ignite the soot burn-off.

Figure 15:
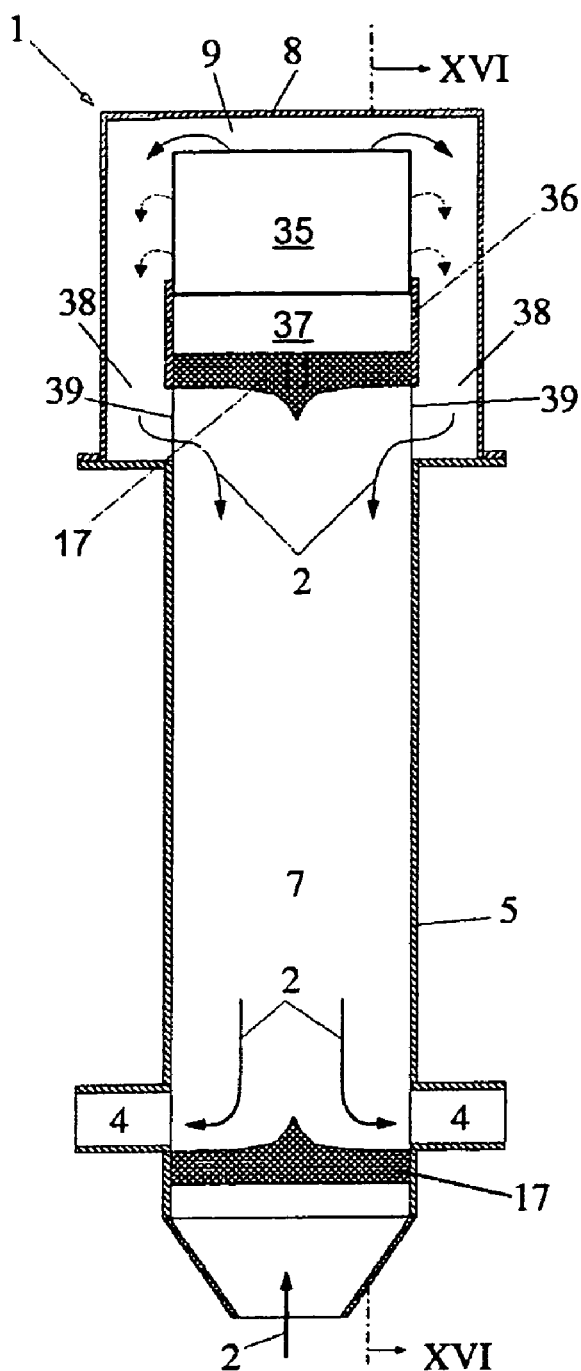
FIG. 15 shows a fourth embodiment of the exhaust-gas converter according to the invention corresponding to section XV-XV from FIG. 16.
Figure 16:
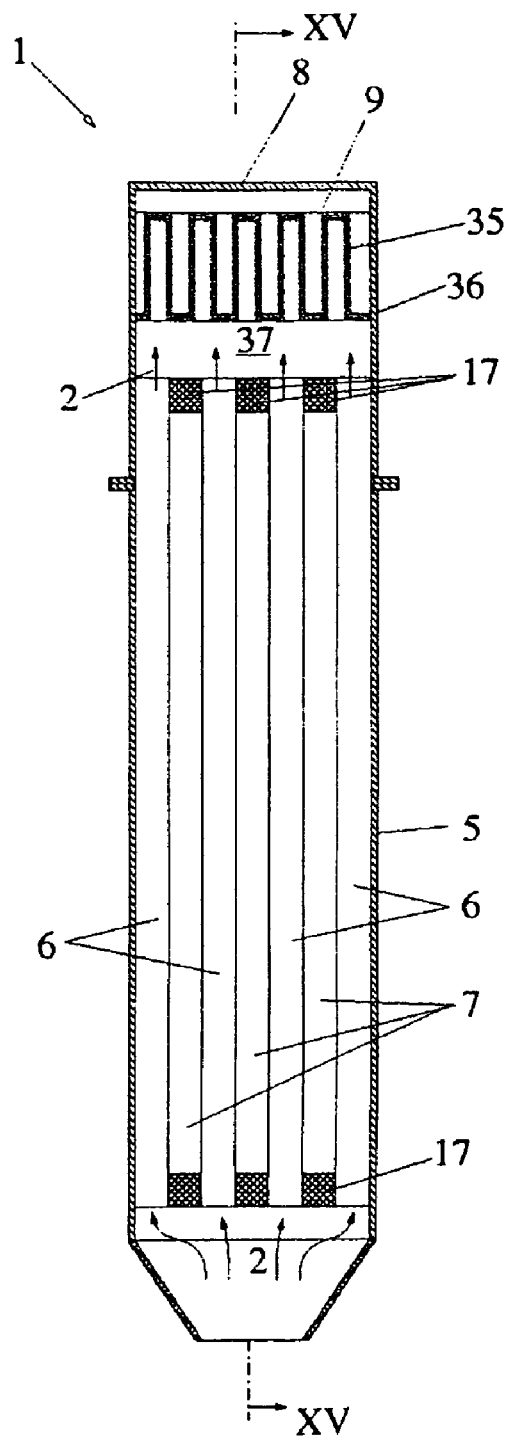
FIG. 16 shows a view corresponding to section XVI-XVI from FIG. 15.

In the embodiments of the exhaust-gas converter 1 shown in FIGS. 15 and 16, the particulate filter 35 is arranged at the upper end region of the inflow passages 6, i.e. in the region thereof which faces the diversion region 9. The, for example, pocket-shaped particulate filter 35 has the incoming exhaust-gas stream 2 from the inflow passages 6 flowing through it, and the exhaust-gas stream which has been filtered by the particulate filter 35 passes laterally out of the pockets of the particulate filter 35 into the transfer passages 38.

At its inflow end, the particulate filter 35 is fitted, in a particulate-tight manner, in a filter passage 36 formed by the housing 5, and is arranged downstream of a filter admission space 37, as seen in the direction of flow of the exhaust-gas stream 2. The particulate-free gas which leaves the particulate filter 35 is guided within lateral passages 38 outside the filter passage 35 and passes via lateral openings 39 in the wall of the housing 5 into the open outflow passages 7, in which, as in the embodiments described above, it flows back.

In this case, the catalytic burner 19 should be arranged in such a way that its exhaust-gas flows into the filter admission space 37 and is distributed uniformly between all the passages or pockets of the particulate filter 35 (not shown). Oxidation catalysts 34, 50 may be arranged on the outflow side of the particulate filter 35 and/or in the outflow passages 7, in order to convert the pollutants which often occur during burn-off of the particulate filter loading, such as carbon monoxide and unburnt hydrocarbons, or in order to burn $CO/H_2$ gas generated in the burner 19 and thereby to deliberately introduce heat for regeneration of the particulate filter.

The soot burn-off which is effected or boosted by $NO_2$ in accordance with what is known as the CRT method, in the structure shown in FIGS. 1, 15 and 16, can expediently be realized by a catalyst 15 which oxidizes NO to form $NO_2$ being arranged in the closed inflow passages 6 upstream of the entry to the filter.

Figure 18:
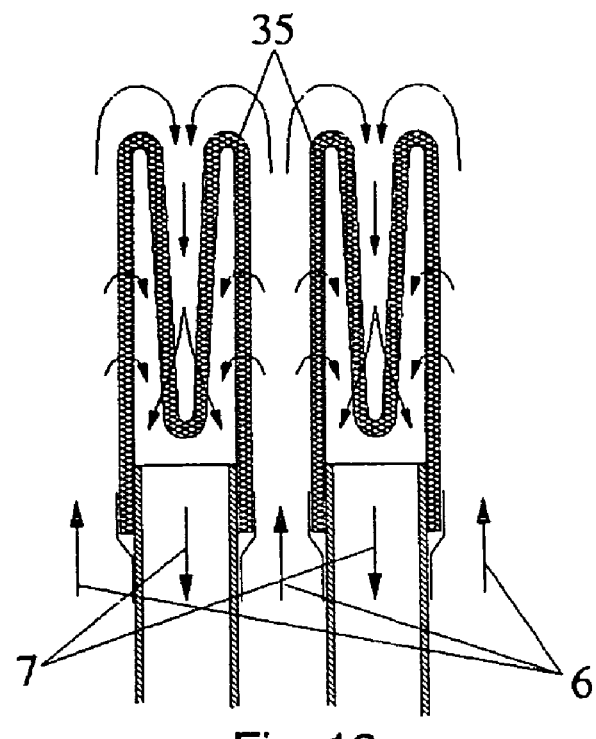
FIG. 18 shows an alternative embodiment to FIG. 17.
Figure 17:
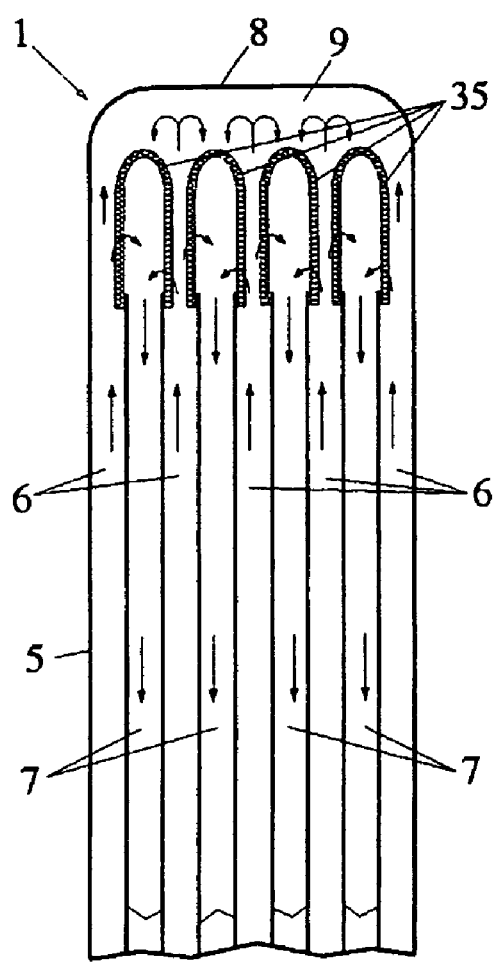
FIG. 17 shows a fifth embodiment of the exhaust-gas converter.
Figure 19:
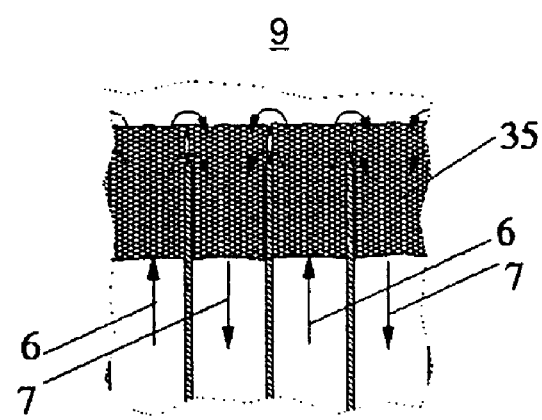
FIG. 19 shows a further alternative embodiment to FIG. 17.

FIGS. 17, 18 and 19 show alternative embodiments of the particulate filter 35. In this case, the incoming flow to the particulate filter 35 and the outgoing flow from it are in countercurrent or in cross-countercurrent. This minimizes the risk of an uncontrollable temperature rise during burn-off of the particulate filter 35 compared to the conventional co-current arrangement.

In FIGS. 17 and 18, particulate filters 35, which are designed as pockets of porous ceramic, woven fabric or fiber nonwoven, are arranged at the entry to the outflow passages 7, and the exhaust-gas stream 2 passes from the inflow passages 6 through the particulate filters 35 into the outflow passages 7. The multiple folding of the filter pocket illustrated in FIG. 18 makes it possible to increase the active filter surface area of the particulate filter 35.

In FIGS. 17 and 18, the flow through the filter pockets 35 is from the outside inward. Alternatively, the filter pockets 35 may also, as in FIG. 1, be arranged at the exit of the inflow passages 6, so that the filtering takes place from the inside outward. This is recommended in particular for the embodiment of the inflow passages 6 illustrated in FIGS. 13 and 14; these inflow passages are particularly easy to provide with a particulate filter 35 of this type operating in accordance with the countercurrent principle by closing off the openings 27 by means of filter materials placed in the upper fold. Alternatively, in the embodiment of the exhaust-gas converter 1 shown in FIGS. 13 and 14, the material of the lateral walls 10 can be replaced by a filter material in the region of the upper fold.

An autonomous countercurrent filter can also be produced from a flexible strip of filter material by the strip being arranged in meandering form in a housing in the same way as the partition wall shown in FIGS. 13 and 14.

In addition to the separation and fixing of the particulates which are to be removed by means of the particulate filter 35, which is designed to be sufficiently fine, as an alternative or in addition it is also possible to extend the residence time of the particulates in the diversion region 9 compared to the residence time of the gas, in such a way that this residence time is sufficient for the desired conversion. This will be the case in particular if the temperature in the diversion region 9 is sufficiently high. Porous materials with a large internal surface area, such as for example open-cell foams, braided fiber fabrics or nonwovens, which are arranged in the inflow passages 6 and/or the outflow passages 7 in the diversion region 9, as illustrated in FIG. 19, are suitable for achieving this lengthening of the residence time. The separation of particulates can be increased by electrostatic charging, for which purpose suitable apparatuses (not shown) may be arranged inside the housing 5. The conversion temperature of the particulates which have been separated out can be reduced in a known way by a catalytically active coating of the porous materials or by the addition of catalytically active substances to the fuel.

Ceramic Modules as Heat Exchangers, as Catalyst Supports and for Particulate Filtering As described in U.S. Pat. No. 4,271,110, honeycomb monoliths with a rectangular individual passage cross section are suitable for use as parallel-passage heat exchangers if every second row of passages is closed off at the end sides. In this case, the medium has to flow through the rows which are closed off at the end sides through lateral openings at both ends of the monolith, producing a parallel-passage assembly 16 between successive rows of passages 6, 7, which allows efficient heat exchange between the rows of inflow passages 6 and the rows of outflow passages 7.

Figure 20:
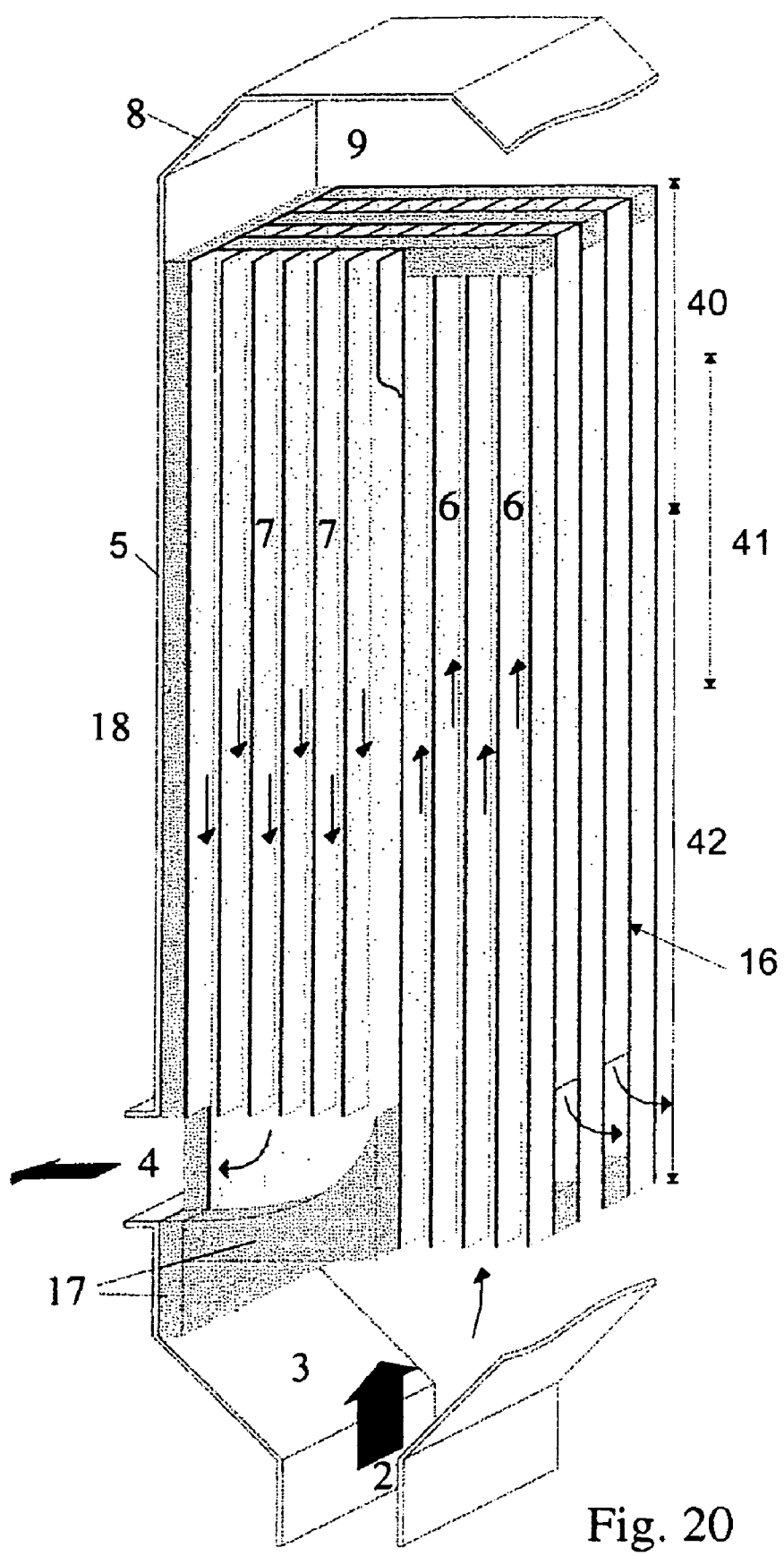
FIG. 20 shows an embodiment of the exhaust-gas converter made from a porous, partially closed material in the form of a monolith with rectangular honeycomb cells.

When transferred to the flow guidance shown in FIG. 1, a parallel-passage arrangement 16 according to the invention is constructed on the basis of a honeycomb monolith as shown in FIG. 20. From the inlet region 3, the exhaust gas 2 flows into the passage rows 6 which are open at the end sides and through them in the direction of the hood 8. If particulate filtering is not required, all the monolith passages are open in the diversion region 9, contrary to what is illustrated in FIG. 20, so that the exhaust gas 2, in the diversion region 9, passes from the inflow passage rows 6 into the outflow passage rows 7 and flows in countercurrent through the latter in the direction of outlet region 4. Here, the outflow passage rows are laterally slotted and closed off with respect to the inlet region 3 by a sealing material 17, so that the exhaust gas emerges laterally. In the diversion region 9, the gas from the catalytic burner 31, which is not illustrated here, is admixed to the exhaust gas 2 as shown in FIG. 1. To convert the pollutants, the walls of the rows of passages, as shown in FIG. 1, are coated with catalysts over a catalyst region 41.

In the case of diesel exhaust gas, according to the invention the particulate filter is integrated in the monolith by the monolith consisting of porous, filtering material at least in the filter region 40. Then, all the inflow passage rows 6 are closed off at their outlet end in the diversion region 9, so that the exhaust gas has to pass through the porous monolith passage walls into the outflow passages 7 and in the process is filtered by the passage walls in the same way as in a conventional diesel soot filter. The flow routing and the arrangement of the catalysts are in this case comparable to FIG. 1. To enable a sufficient heat exchanger region 42 of the monolith to be used for pure heat exchange without filtering, and to enable all of the filtered exhaust gas to be guided past the catalysts 15, 33, 34, the walls of the inflow passages have to be sealed in a substantially gastight manner over the desired length. This can be done in a known way, for example by coating or impregnating and subsequently firing to form a seal. The parallel-passage arrangement 16 in the form of the monolith, as in the other examples, is fitted into the housing 5 by way of a preferably flexible sealing device 18 and fixed in place.

As an alternative to a monolith, according to the invention it is also possible, with the same functionality, to construct a parallel-passage arrangement 16 from a bundle of porous tubes as inflow passages 6 (not shown). In this case, all the tubes of the bundle, as in the case of the monolith, are sealed over a certain length and provided with the appropriate catalyst on their inner and outer surfaces. Moreover, the tubes are embedded in a sealing material 17 at their inflow ends, so that the inlet region 3 is separated in a substantially gastight manner from the outlet region 4. The flow is once again routed in the same way as in the monolith analogous to FIG. 1, with the outflow passages 7 being formed by the space between the tubes 6, and spacer elements 43 in the form of perforated disks or grids at various heights of the tube bundle ensuring a uniform tube spacing. The spacer elements 43 may in this case, as is known for tube bundle equipment, provide a radially symmetrical cross-countercurrent routing of the exhaust gas 2, in which case the outlet region 4 may extend over the entire circumference of the tube bundle. In addition to circular tubes 6, it is also possible to use tubes with a cross section which is not circular, in particular tubes with an increased inner wall surface area (e.g. corrugated, fluted or clover-leaf structures).

The porous base structure of the monoliths or tubes may in a known way consist of ceramic or metallic components and be produced, for example, by extrusion and sintering. In this case, it is preferable for coarse porous base structure to be provided, on the side of the inflow passages 6, with a fine porous covering layer for the actual filtering.

Integration of Different Exhaust-Gas Treatment Functions

The various conversion functions described above can be integrated in the exhaust-gas converter 1 depending on the particular application. This is summarized by way of example once again below for the full diesel exhaust-gas purification based on the embodiment of the exhaust-gas converter 1 shown in FIG. 1. Here, the inflow passages 6 and the outflow passages 7, as in the embodiment shown in FIGS. 13 and 14, are formed from a sheet-metal strip which runs up and down in meandering form. In the filter region 40, the sheet-metal strip is perforated in the region of the upper fold and covered on the inside by a woven filter fabric which is suitable for filtering the soot formed in diesel internal combustion engines, so that in this way the particulate filter 35 is formed. As the exhaust gas passes through the fabric of the particulate filter 35, the soot is separated out. If in this case the oxidation catalyst 15, which oxidizes NO contained in the exhaust gas to form $NO_2$, is provided upstream of entry to the particulate filter, this can lead to continuous, at least partial burn-off of the soot in accordance with the CRT method. The soot which is not burnt off is ignited at relatively long intervals by an increase in temperature brought about by the catalytic burner 19. The filtered exhaust gas flows in the outflow passages 7 via the $NO_x$ storage catalyst 33, at which the remaining NO and $NO_2$ is bound.

To supply heat and reducing gas, the catalytic burner 19, which can be used for heating during a cold start, for ignition of the soot burn-off, to provide a CO and $H_2$-containing regeneration gas for the regeneration of the $NO_x$ storage catalyst 33, and if appropriate also for high-temperature regeneration of the $NO_x$ storage catalyst 33 in the event of any sulfur poisoning, and for the targeted release of heat at an oxidation catalyst 50 on the outflow side of the particulate filter 35, is arranged on the hood 8 of the housing 5.

For these purposes, the catalytic burner 19 can be operated with a variable fuel/gas mix and its heating power controlled, by means of the control unit 52, on the basis of the temperatures measured in the regions 40 and 41 within the exhaust-gas converter 1. The control device 52 ensures that the catalysts 15, 33, 34 are always operating in an optimum temperature range and the catalytic burner 19 provides a reducing gas within the required intervals.

As has been explained above, the $NO_x$ storage catalyst 33 is regenerated at more regular periodic intervals by a mix of hydrogen and carbon monoxide regenerated in the catalytic burner 19. Any regeneration gas which breaks through can be converted at the subsequent oxidation catalyst 34 with an oxygen storage function.

In a manner which is not illustrated, the exhaust-gas stream 2 can be cooled between the internal combustion engine and the exhaust-gas converter 1, in order to prevent overheating of the exhaust-gas converter in high-load operation.

In the case of exhaust-gas purification methods which require periodic regeneration of a storage material, such as for example in the case of the $NO_x$ storage catalyst 33 or of the particulate filter 35, the exhaust-gas converter 1 may comprise a plurality of units through which medium flows in parallel, in which case only one unit is regenerated with a reduced exhaust-gas throughput. This allows the fuel consumption to be considerably reduced.

It is also possible for the functions of an exhaust-gas muffler and a stationary heater to be integrated in the exhaust-gas converter 1, in a manner which is not illustrated, so that a plurality of components can be combined in a single unit. To achieve the exhaust-gas muffling, by way of example, the closed inflow passages 6 in the parallel-passage assembly 16 can be designed to be of different lengths. For heating purposes, as shown in FIG. 1, it is possible for heat to be temporarily or permanently withdrawn via a heat exchanger 51 installed in the hood 8, for heating purposes. It is in this way possible to provide a method and an apparatus for combined exhaust-gas purification in a motor vehicle, for exhaust-gas muffling and/or to provide heat for heating the passenger compartment, wherein all the elements required for the exhaust-gas purification, the exhaust-gas muffling and/or the removal of heat are combined in a single module.

The invention claimed is:

1. A method of purifying an exhaust gases from a combustion engine in a purification unit in which the purification unit contains a fuel burner and combining counter-current heat exchange and catalytic conversion of noxious compounds, the method comprising the steps of:
   a) allowing the incoming exhaust gas (2) to enter the unit via an inlet region (3) from where the incoming exhaust gas (2) is axially distributed to a plurality of parallel inflow passages (6), after flowing through the passages the incoming exhaust gas (2) is deflected in a diversion region (9), located opposite to the inlet region (3), into a plurality of parallel outflow passages (7), each of which is situated between two inflow passages (6), flowing therein an opposite direction and providing heat exchange with the incoming exhaust gas (2) and exiting the plurality of parallel outflow passages (7) through an outlet region (4) located adjacent the inlet region (3), and the inlet region (3) and the outlet region (4) are sealed with respect to one another;
   b) the plurality of inflow passages (6) being partially coated with an oxidation catalyst (15) for the conversion of oxidizable compounds including NO to $NO_2$, and the plurality of parallel outflow passages (7) being partially coated with a NOx conversion catalyst (33), and all catalysts being located adjacent the diversion region (9) thereby leaving the inlet region (3), located adjacent the engine exhaust inlet, substantially catalyst-free;
   c) a catalytic fuel burner (19), containing at least one oxidation catalyst (33, 34), being operatable in one of a lean burn mode or a rich burn mode with air or with portion of the lean engine exhaust gas as an oxidizing agent, the burner exhaust being fed into the diversion region (9), and in the rich burn mode, the burner exhaust is further oxidized at the oxidation catalyst (34) to at least one of create additional heat and enhance NOx reduction at the NOx conversion catalyst (33).

2. The method as claimed in claim 1, further comprising the step of positioning a second oxidation catalyst (33) behind the NOx conversion catalyst (33).

3. A method for purifying exhaust gases, the gases comprising combustible and $NO_x$ containing exhaust-gas constituents, from a lean-burn internal combustion engine, in an exhaust-gas converter (1), having a heat exchanger (12) with catalysts (15, 33) arranged in at least one inflow passage (6) and at least one outflow passage (7), in which incoming exhaust gas (2) flowing in is heated by heat exchange with exhaust gas flowing out of the heat exchanger, and the heat being supplied to the incoming exhaust gas, the method comprising the steps of:
   allowing the incoming exhaust gas (2) to enter an inlet region (3) through a plurality of parallel inflow passages (6) of the heat exchanger (12) without encountering any diversion or flow obstacle which is susceptible to blockage, and the incoming exhaust gas (2) flowing through the plurality of parallel inflow passages into a diversion region (9), the diversion region (9) being located opposite the inlet region (3), the incoming exhaust gas (2) being deflected in the diversion region (9) into a plurality of parallel outflow passages (7), each of which is situated between two inflow passages (6), the incoming exhaust gas (2) flows in the plurality of outflow passages (7) in an opposite direction to a flow direction of the incoming exhaust gas in the plurality of inflow passages (6), whereby heat exchange between the incoming exhaust gas in the plurality of inflow passages (6) and the incoming exhaust gas in the plurality of outflow passages (7) is promoted, the incoming exhaust gas (2) exiting the plurality of outflow passages (7) via an outlet region (4) located adjacent the inlet region (3), and the inlet region (3) and the outlet region (4) being sealed with respect to one another;

feeding heat in a form of burner exhaust gas to the incoming exhaust gas by a burner (19) which is arranged in the diversion region (9), the burner (19) is electrically heated and is provided with at least one oxidation catalyst (31, 32), the burner (19) being operated with fuel and one or more of air and engine exhaust gas in such a way that the burner (19) supplies either an oxidizing or a reducing (substantially CO- and $H_2$-containing) exhaust gas, the burner (19) being operated in one of a lean burn mode and a rich burn mode with one of air and portion of the lean engine exhaust gas as an oxidizing agent, the burner exhaust gas being fed into the diversion region (9), and during operation in the rich burn mode, the burner exhaust gas being used to at least one of oxidized at the oxidation catalyst to create additional heat and enhance $NO_x$ reduction at a $NO_x$ conversion catalyst (33), admixing the burner exhaust gas with the incoming exhaust gas which emerges from the plurality of inflow passages (6) and enters the plurality of outflow passages (7) together with the burner exhaust gas, and nitrogen oxides are removed from the incoming exhaust gas by at least one deNOxing catalyst (33) which is present in the plurality of outflow passages (7), setting the gas and fuel throughput of the burner exhaust gas by a control unit (52) in such a way that,
during a cold start the catalyst (15, 33) is quickly heated to an optimum operating temperature and is held at the optimum operating temperature, and
a reducing burner exhaust gas is generated at regular intervals to regenerate the deNOxing catalyst (33).

4. The method as claimed in claim 3, further comprising the step of setting the required temperature and composition of the incoming exhaust gas for sulfur regeneration of an $NO_x$ storage catalyst, which forms the deNOxing catalyst (33), at periodic intervals by the control unit (52), periodically regenerating the $NO_x$ storage catalyst by one of a fuel rich engine exhaust gas or by periodically adding fuel rich burner exhaust gas to the diversion region (9), and accomplishing a sulfur regeneration by adding fuel rich burner exhaust gas over an extended period of time.

5. The method as claimed in claim 3, further comprising the step of combining one or more of all of the elements which are required for the incoming exhaust gas purification, incoming exhaust gas muffling and the discharge of heat in one exhaust-gas converter (1), the muffling being boosted by one or more of different lengths of the plurality of inflow and outflow passages (6, 7) and by other passive or active muffling elements in the inlet region (3), in one or more of the outlet region (4) and in the diversion region (9) of a hood (8), and the discharge of heat, in particular for heating a passenger compartment, being effected by one or more of the incoming exhaust gas in the diversion region (9) and the hot gas from the burner (19) being one of partially or completely passed via a heat exchanger (51) which is suitable for this purpose.

6. The method as claimed in claim 3, further comprising the step of operating at least two substantially identical exhaust-gas converters (1) in parallel for the period of regeneration one or more of the $NO_x$ conversion and $NO_x$ storage catalyst (33) or of the particulate filter (35), throttling the exhaust-gas stream through the unit to be regenerated so that the regeneration is carried out with a considerably reduced consumption of at least one of additional energy and a regeneration agent.

7. The heat supply apparatus for use in the method as claimed in claim 3, wherein which heat supply apparatus is a catalytic burner (19), the catalytic burner (19) having an at least partially electrically heatable catalyst (31, 32), which is acted on by a mixture of an oxygen-containing gas (30) and a fuel (29) or a mixture of gas (30), fuel (29) and water, the control unit (52) facilitates altering the supply of gas, fuel and water in such a way that the fuel is either completely burnt or is at least partially converted into CO and $H_2$, and the catalytic burner (19) being connected to a hood (8) of the housing (5) in such a manner that the fuel gas is fed into the diversion region (9) or the filter admission space (37) and is uniformly distributed between the passages of the filter (35) or the plurality of outflow passages (7), the uniform distribution being ensured by one of internal fittings and a suitable flow guidance.

8. The method as claimed in claim 3, for purifying incoming exhaust gases further comprising combustible, $NO_x$ containing exhaust gas constituents in one of particulate or soot form, from diesel engines, further comprising the steps of:
passing the incoming exhaust gas (6) from the the plurality of inflow passages (6) into a particulate filter (35) arranged in the diversion region (9) and passing the incoming exhaust gas (6) through the particulate filter (35) into the the plurality of outflow passages (7),
setting the gas and fuel throughput of the burner exhaust gas being by the control unit (52) in such a way that the temperature of the particulate filter (35) is either permanently kept at such a high level that the soot which is deposited burns off, or the temperature is periodically raised to a level sufficient for the soot to burn off.

9. The method as claimed in claim 8, further comprising the step of setting the temperature of the particulate filter (35), which is required for continuous or periodic regeneration thereof, by reducing burner exhaust gas being burnt on an oxidation catalyst (50), which is arranged on the outflow side of the particulate filter (35) and in thermal contact with the latter.

10. An apparatus for purifying exhaust gases having one of combustible and $NO_x$ containing exhaust gas constituents, from lean-burn internal combustion engines, the apparatus comprising:
a parallel passage arrangement (16) formed from a monolith of a plurality of passages consisting of ceramic or metallic material with a rectangular passage cross section, every second row of the passages being used as an inflow passage (6) and every other row of the passages being used as outflow passage (7), the outflow passages (7) being closed off at an end side facing an inlet region (3) and being laterally open toward an outlet region (4) through continuous slots;
a housing (5) with a hood (8) and openings for incoming and outgoing exhaust gas surrounding the monolith, the inlet region (3) being sealed off with respect to the outlet region (4) by a sealing device (17) between the monolith and the housing (8), and the arrangement of a purification component (15, 33, 34, 35) required for the conversion, being effected by coating passage walls, the monolith, which is used for the parallel passage arrangement (16), over the entire length or at least in the filter region (40), being made from a porous filter ceramic or a porous metal suitable for the particulate filtering, one or more of the inflow and outflow passages of the monolith, starting at the inlet region (3), being at least substantially gas tight or being made gas tight by one of a glaze or corresponding coating, over a length of heat exchange and catalyst regions (41, 42), the inflow passages (6) being closed off at an end face which is directed toward the hood (8), so that in the filter region (40) the exhaust gas passes from the inflow passages (6) into the outflow passages (7) and being filtered in the process, and the particulates which have been deposited on the filter being burnt off by an electrical heater which is integrated in the filter in a region of one of the hood (8) or by the hot fuel gas fed into the hood (8) from one of a thermal or catalytic burner (19).

11. The apparatus as claimed in claim 10, wherein a gas exit side of one of the particulate filter (35) or of the filter region (40) is provided with an oxidation catalyst.

12. An apparatus for purifying exhaust gases having exhaust-gas constituents which are one or more of combustible, contain $NO_x$ and are in particulate or soot form, the exhaust gases coming from lean-burn internal combustion engines, the apparatus comprising:

an exhaust-gas heat exchanger (12), which includes a housing (5) and a plurality of inflow passages (6), arranged next to one another in the housing (5), and outflow passages (7) located between the inflow passages (6), one of the inflow passages (6) or the outflow passages (7) being closed on all sides at lateral surfaces (10, 11) and, together with the housing (5), forming the outflow passages (7) or inflow passages (6) located between them, the inflow passages (6) and the outflow passages (7) together forming a parallel-passage arrangement (16), and to achieve a constant distance between adjacent inflow passages (6) or outflow passages (7), either spacer elements (14) are arranged therein, or the side walls (10) of the inflow passages (6) are supported against one another on account of being profiled, and the housing (5) forms a diversion region (9) at a transition from the inflow passages (60) into the outflow passages (7), a catalytic burner (19), which is arranged in one of the diversion region (9) or a filter admission space (37) of the exhaust-gas heat exchanger (12), components (15, 33, 34, 35) for purifying one of the conversion, separation or storage of the exhaust-gas constituents which are one or more of combustible, contain $NO_x$ and are in particulate or soot form, the purifying components are arranged within the exhaust-gas heat exchanger (12), an inlet region (3) and an outlet region (4), which are formed by the housing (5), one or more of the inflow passages (6) and the outflow passages (76), at the filter admission space (37), being connected to the respectively adjacent passages (7, 6) and the housing (5) and sealed with respect to one another by one or more of welding, soldering, folding and a sealing device (17) in such a way that no leakage flow or only a negligible leakage flow occurs between the inlet region (3) and the outlet region (4).

13. The apparatus as claimed in claim 12, wherein the inlet region (3) is arranged in such a manner that the flow to the inflow passages (6) is in an axial direction, and the outlet region (4) is arranged in such a manner that the exhaust gases exits the outflow passages (7) laterally.

14. The apparatus as claimed in claim 12, wherein the inflow passages (6) are produced by single or multiple, concertina-like folding of a profiled or flat sheet-metal strip, the folding taking place either longitudinally or transversely with respect to a main direction of flow in the inflow passages (6).

15. The apparatus as claimed in claim 12, wherein the inflow passages (6) in the inlet region (3) are connected by one or more of folding, combining side walls (10) of the inflow passages (6) and soldered or welded joints, and are covered by caps (13), in such a manner as to form an axial entry which is favorable in terms of flow.

16. The apparatus as claimed in claim 12, wherein one of the inflow passages (6) or outflow passages (7), which are closed on all sides at their lateral surface, are connected at an end face in the diversion region (9) to a particulate filter (35) or are closed at their end face in the diversion region (9) and before this have lateral openings, which one of consist of a porous material or are covered with a porous material, over the length of the filter region (40).

* * * * *

UNITED STATES PATENT AND TRADEMARK OFFICE
CERTIFICATE OF CORRECTION

PATENT NO. : 7,797,928 B2  Page 1 of 1
APPLICATION NO. : 10/556336
DATED : September 21, 2010
INVENTOR(S) : Gerhard Friedrich et al.

It is certified that error appears in the above-identified patent and that said Letters Patent is hereby corrected as shown below:

On the title page, item (73) Assignee: change "Univeritaet Stuttgart" to "Universitart Stuttgart";

Column 5, line 25, change "Eigenberger: Enffernung" to "Eigenberger: Entfernung";

Column 8, line 19, change "honeycomb cells;" to "honeycomb cells.";

Column 15, line 22, change "dust, soot, these" to "dust, soot), these";

Column 20, line 4, change "purifying an exhaust gases" to "purifying exhaust gases";

Column 22, line 29, change "into the the plurality of" to "into the plurality of";

Column 24, line 10, change "the outflow passages (76)" to "the outflow passages (7)".

Signed and Sealed this
Fifth Day of July, 2011

David J. Kappos
*Director of the United States Patent and Trademark Office*

UNITED STATES PATENT AND TRADEMARK OFFICE
CERTIFICATE OF CORRECTION

PATENT NO.        : 7,797,928 B2
APPLICATION NO.   : 10/556336
DATED             : September 21, 2010
INVENTOR(S)       : Gerhard Friedrich et al.

It is certified that error appears in the above-identified patent and that said Letters Patent is hereby corrected as shown below:

On the title page, item (73) Assignee: Change "Universitart Stuttgart" to "Universitaet Stuttgart".

Signed and Sealed this
Thirtieth Day of August, 2011

David J. Kappos
*Director of the United States Patent and Trademark Office*